(12) United States Patent
Vankamamidi et al.

(10) Patent No.: US 12,050,775 B2
(45) Date of Patent: Jul. 30, 2024

(54) TECHNIQUES FOR DETERMINING AND USING TEMPERATURE CLASSIFICATIONS WITH ADJUSTABLE CLASSIFICATION BOUNDARIES

(71) Applicant: Dell Products L.P., Hopkinton, MA (US)

(72) Inventors: Vamsi K. Vankamamidi, Hopkinton, MA (US); Ajay Karri, South Grafton, MA (US)

(73) Assignee: Dell Products L.P., Hopkinton, MA (US)

( * ) Notice: Subject to any disclaimer, the term of this patent is extended or adjusted under 35 U.S.C. 154(b) by 100 days.

(21) Appl. No.: 17/971,939

(22) Filed: Oct. 24, 2022

(65) Prior Publication Data
US 2024/0134531 A1    Apr. 25, 2024

(51) Int. Cl.
*G06F 3/06* (2006.01)
(52) U.S. Cl.
CPC ............ *G06F 3/0611* (2013.01); *G06F 3/064* (2013.01); *G06F 3/0653* (2013.01); *G06F 3/0673* (2013.01)
(58) Field of Classification Search
CPC ...... G06F 3/0611; G06F 3/064; G06F 3/0653; G06F 3/0673
See application file for complete search history.

(56) References Cited

U.S. PATENT DOCUMENTS

2018/0321860 A1* 11/2018 Marchenko ......... G06F 11/3433
2021/0389899 A1* 12/2021 Soukhman .......... G06F 12/0246

OTHER PUBLICATIONS

J. Tai, D. Liu, Z. Yang, X. Zhu, J. Lo and N. Mi, "Improving Flash Resource Utilization at Minimal Management Cost in Virtualized Flash-Based Storage Systems," in IEEE Transactions on Cloud Computing, vol. 5, No. 3, pp. 537-549, Jul. 1-Sep. 2017, doi: 10.1109/TCC.2015.2424886. (Year: 2017).*
U.S. Appl. No. 17/959,244, filed Oct. 3, 2022, entitled Techniques for Collecting and Utilizing Activity Metrics, to Vamsi K. Vankamamidi, et al.

* cited by examiner

*Primary Examiner* — Kalpit Parikh
(74) *Attorney, Agent, or Firm* — Muirhead and Saturnelli, LLC

(57) ABSTRACT

In a multi-tiered system, a read temperature classification and write temperature classification per virtual block (VLB) can be determined based on the content referenced by each VLB. The temperature classifications of VLBs can be determined using temperature scales which map read and write activity levels to corresponding temperature classifications. The temperature scales can have classification boundaries adjusted based on feedback of operations performed including down-tiering, garbage collection, and compaction and appending. In one use case, a number of free blocks in a high-performance first tier can be below a minimum and processing can be performed to locate a source block of the first tier partially filled with hot content, store the hot content contiguously on a target block of the first tier, flush write data from a log, and store the write data on the target block by appending the write data to the existing hot content.

20 Claims, 17 Drawing Sheets

TECHNIQUES FOR DETERMINING AND USING TEMPERATURE CLASSIFICATIONS WITH ADJUSTABLE CLASSIFICATION BOUNDARIES

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY OF THE PRESENT DISCLOSURE

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise: receiving metric sets for a plurality of virtual blocks, wherein each of the plurality of virtual blocks has associated I/O activity characterized by a corresponding one of the metric sets, wherein each of the plurality of virtual blocks references content stored in one of a plurality of physical blocks, wherein each of the plurality of physical blocks is stored in one of a plurality of storage tiers including a first storage tier and a second storage tier which is a lower performance tier than the first storage tier; determining a plurality of temperature classifications for the plurality of virtual blocks in accordance with the metric sets, a current point in time, and at least a first temperature scale, wherein the first temperature scale maps a first temperature metric denoting I/O activity to one of a plurality of temperature classifications, wherein the plurality of temperature classifications includes a hot classification and a cold classification, wherein each of the plurality of virtual blocks with the hot classification indicates that said each virtual block has a relatively higher activity level in comparison to every other virtual block of the plurality of virtual blocks having the cold classification; determining that a current number of free blocks in the first storage tier is below a minimum; and responsive to determining the current number of free blocks in the first storage tier is below the minimum, performing first processing including: determining a first of the plurality of physical blocks associated with a first set of one or more of the plurality of virtual blocks, wherein each virtual block of the first set references content stored in the first physical block, wherein each virtual block of the first set has the hot classification, wherein the first physical block is included in the first storage tier and is partially filled with first content referenced by the first set of virtual blocks; copying the first content from the first physical block of the first storage tier to a second physical block of the first storage tier; flushing a record from a user data log, wherein the record represents a first write I/O operation that writes updated content; and storing the updated content on the second physical block, wherein said storing includes appending the updated content to the first content on the second physical block.

In at least one embodiment, the first content can be stored as a plurality of non-contiguous data portions on the first physical block. The first content can be stored on the second physical block as a single contiguous data portion. The first set of virtual blocks can includes a first virtual block, wherein a first of the metric sets characterizes I/O activity of a first data portion of the first content, and wherein the first data portion is referenced by the first virtual block. Processing can include: determining, in accordance with the first metric set and the current point in time, a revised temperature regarding any of read activity and write activity of the first virtual block; and mapping the revised temperature to the hot classification in accordance with the first temperature scale. The plurality of temperature classifications can include a warm classification, wherein each of the plurality of virtual blocks with the warm classification can indicate that said each virtual block has a relatively higher activity level in comparison to every other virtual block of the plurality of virtual blocks having the cold classification and that said each block has a relatively lower activity level in comparison to every other virtual block of the plurality of virtual blocks having the hot classification.

In at least one embodiment, the first temperature scale can include a first adjustable boundary, denoting an activity level boundary between the cold classification and the warm classification, and can include a second adjustable boundary, denoting an activity level boundary between the warm classification and the hot classification. Processing can include adjusting at least one of the first adjustable boundary or the second adjustable boundary in accordance with feedback regarding one or more operations performed.

In at least one embodiment, the first storage tier can have a first utilization above a maximum utilization threshold, and processing can include: setting a system in which said method is performed in a down-tiering or demotion mode responsive to determining the first utilization of the first storage tier is above the maximum threshold, wherein said feedback includes an indication that the system is in said down-tiering or demotion mode; and demoting data portions stored in the first storage to the second storage tier. Processing can include: determining that a demand rate, denoting a rate at which free physical blocks of the first storage tier are consumed, is greater than a down-tiering or demotion rate at which free physical blocks are generated in the first storage tier; and responsive to determining that the demand rate is greater than the down-tiering or demotion rate, adjusting the first adjustable boundary between the cold classification and the warm classification, and wherein said feedback includes the demand rate and the down-tiering or demotion rate. Responsive to determining that the demand rate is greater than the down-tiering or demotion rate, said adjusting the first adjustable boundary can increase the first adjustable boundary to increase a portion of a range of temperature values mapped to the cold classification. Processing can include: determining that a demand rate, denoting a rate at which free physical blocks of the first storage tier are consumed, is less than a down-tiering or demotion rate by at least a specified amount, wherein the down-tiering or demotion rate denotes a rate at which free physical blocks are generated in the first storage tier; and responsive to determining that the demand rate is less than the down-tiering or demotion rate by at least the specified amount, adjusting the first adjustable boundary between the cold classification and the warm classification, wherein said feedback includes the demand rate and the down-tiering or demotion rate. Responsive to determining that the demand rate is less than the down-tiering or demotion rate by at least the specified amount, said adjusting the first adjustable boundary can decrease the first adjustable boundary to decrease a portion of a range of temperature values mapped to the cold classification.

In at least one embodiment, a system in which the method is performed can be in a compact and append mode and there can be an insufficient number of partially filled physical blocks with content having the hot classification in the first storage tier to satisfy a flush rate. The flush rate can denote a rate at which recorded write I/O operations stored in a log are flushed from the log, wherein write data written by the recorded write I/O operations flushed from the log can be stored in the first storage tier, and wherein said feedback can include an indication that the system is in the compact and append mode and an indication that there is an insufficient number of partially filled physical blocks with content having the hot classification in the first storage tier to satisfy a flush rate. Processing can include, responsive to determining the system is in the compact and append mode and that there is an insufficient number of partially filled physical blocks with content having the hot classification in the first storage tier to satisfy a flush rate, adjusting the second adjustable boundary denoting an activity level boundary between the warm classification and the hot classification. Adjusting the second adjustable boundary can include decreasing the second adjustable boundary to thereby expand the portion of a range of temperature values mapped to the hot classification.

In at least one embodiment, a system in which the method is performed may not be not in a compact and append mode with respect to the first storage tier and the system can perform garbage collection to collect content which is stored in the first storage tier and which has the warm classification. The feedback can include an indication that the system is not in the compact and append mode and an indication that the system is performing garbage collection to collect content which is stored in the first storage tier and which has the warm classification. Responsive to determining that the system is not in the compact and append mode with respect to the first storage tier and that the system is performing garbage collection to collect content which is stored in the first storage tier and which has the warm classification, processing can include adjusting the second adjustable boundary. Adjusting the second adjustable boundary can include increasing the second adjustable boundary to thereby reduce a portion of a range of temperature values mapped to the hot classification.

BRIEF DESCRIPTION OF THE DRAWINGS

Features and advantages of the present disclosure will become more apparent from the following detailed description of exemplary embodiments thereof taken in conjunction with the accompanying drawings in which.

DETAILED DESCRIPTION OF EMBODIMENT(S)

Figure 1:
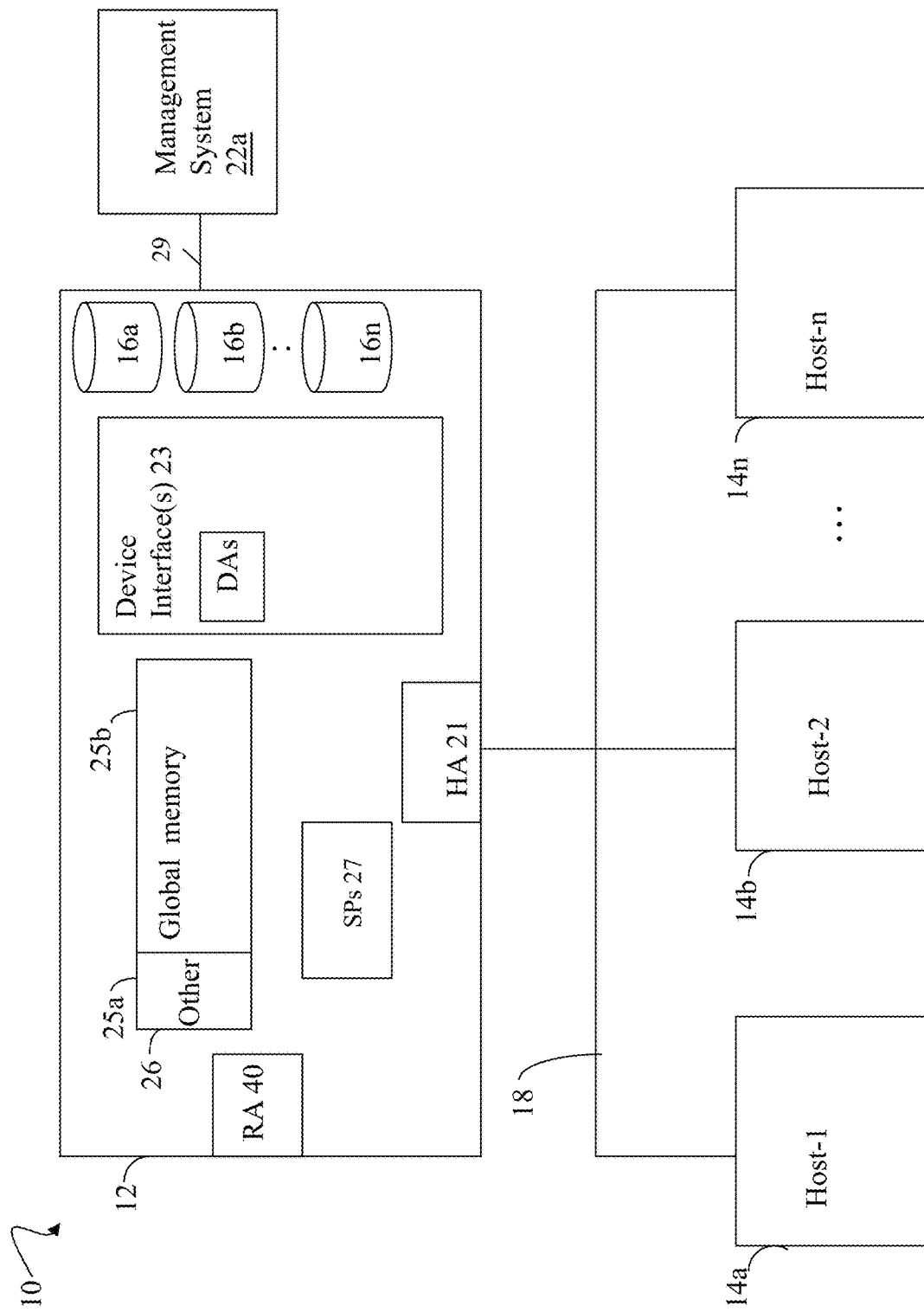
FIG. 1 is an example of components that may be included in a system in accordance with the techniques of the present disclosure.

In some data storage systems, user data or content located at logical addresses can be stored on multiple storage tiers. A multi-tiered system can include multiple tiers of storage devices. Each tier can include non-volatile storage devices of one particular performance classification such that the tiers can be ranked in terms of relative performance. For example, in at least one system, the tiers can include a first tier 1 of non-volatile SSDs (solid state drives or devices), such as a tier of flash-based drives, and a second tier 2 of HDDs (hard disk drives) or rotating disk drives, where tier 1 is a higher performance tier than tier2. Put another way and more generally, drives of tier 2 can be characterized as a relatively slower performance media than drives of tier1.

In some multi-tiered systems as noted above, the amount of SSD capacity of the higher performance tier for storing user data can be generally much smaller than the HDD capacity of the lower performance tier for storing user data. In at least one system, the SSDs can also effectively act like a write through cache. Since the amount of SSD capacity (e.g., capacity of the higher performance tier) can generally be much less than the HDD capacity (e.g., capacity of the lower performance tier), not all user data can be stored in the SSD tier. As a result, one or more criteria can be specified and used to decide what particular portions of user data or content are stored in each of the SSD tier and the HDD tier.

Described in the following paragraphs are techniques that can be used to track and update one or more metrics of different stored content or data portions, where the metrics characterize the temperature of the corresponding content or data portions. In at least one embodiment, the tracked metrics can be used to further determine a temperature classification, categorization or rating of the corresponding stored content.

In at least one embodiment, the temperature classification, categorization or rating of stored content can be used to determine what content or data portions from the HDD tier to promote to the SSD tier.

In at least one embodiment, the temperature classification, categorization or rating of stored content can be used to determine what content or data portions from the SSD tier to demote to the HDD tier.

In at least one embodiment, content or data portions stored in the data storage system can be categorized as having a temperature which is one of multiple defined temperature ratings, classifications or categories. In at least one embodiment, content such as associated with a virtual layer block or VLB or a physical block or PLB can be assigned one of the following 3 temperature classifications: hot, warm, and cold. Hot can denote the highest relative temperature or activity level. Warm can denote the second highest or middle level of relative activity level. Cold can denote the lowest relative temperature or activity level.

In at least one embodiment, newly written content can be initially assigned a temperature classification of hot denoting a high activity level, and the newly written content can be stored in the SSD tier. In such an embodiment, existing content currently stored in the SSD tier having an associated temperature classification or categorization of cold can be demoted to the HDD tier to create free available capacity for use in storing the newly written content as well as other content classified as hot.

In at least one embodiment, the temperature of stored content can be used in connection with performing garbage collection (GC) within each tier such as within the HDD tier and within the SSD tier. In at least one embodiment, processing can identify multiple data portions stored on multiple physical blocks with the same or similar temperature/temperature classification so that such multiple data portions can be aggregated or combined and stored in a single physical block. In this manner, multiple source blocks of the same tier, where such multiple source blocks are only partially filled with valid content having the same or similar temperature or the same temperature classification, can be combined and stored in a single target block thereby freeing or making available the multiple source blocks. Additionally, the resulting single target block of content having the same or similar temperature or same temperature classification can then be moved between tiers as appropriate. For example, if the single block includes cold data and the block is in the SSD tier, the cold data can be demoted to the HDD tier. As another example, if the single block includes hot data and the block is included in the HDD tier, hot data can be promoted to the SSD tier.

In at least one embodiment, the one or more metrics can generally be used to determine a temperature of stored content or an associated data portion and can be used in any suitable application. In such an embodiment, the temperatures of stored content or data portions can be mapped to corresponding temperature classifications used to determine the movement of such content or data portions within and also across storage tiers.

In at least one embodiment, one or more metrics can be mapped or scaled to a corresponding temperature classification, such as one of hot, warm or cold. In such an embodiment, the boundaries between the different temperature classifications can be dynamically adjusted, such as increased or decreased, based on feedback. In at least one embodiment, a separate read temperature scaling can be applied and used in connection with one or more read metrics, and a separate write temperature scaling can be applied and used in connection with one or more write metrics. The read temperature scaling can map a read metric or temperature to a corresponding read temperature classification that is one of hot, warm or cold (also sometimes referred to respectively as read hot, read warm or read cold). The write temperature scaling can map a write metric to a corresponding write temperature classification that is one of hot, warm or cold (also sometimes referred to respectively as write hot, write warm or write cold). The boundaries between the different temperature classifications can be adjusted, for example, based on desired processing rates. For example, the system can be in a down-tiering or demotion mode where data stored on the SSD tier can be demoted to the HDD tier. The down-tiering mode can be triggered, for example, responsive to determining that the current utilization of the SSD tier is above a specified maximum threshold. In this case, processing can be performed to generate free blocks of the SSD tier in order to store newly received written content in the SSD tier. A down-tiering rate can be determined indicating a rate at which free blocks in the SSD tier are generated while in the down-tiering mode and performing processing to generate free blocks of the SSD tier. If the measured down-tiering rate is insufficient to satisfy a corresponding demand for free SSD tier blocks, the boundary between the cold and warm temperature classification (Bcw) can be increased such that the range of metric values falling into the cold temperature classification increases to thereby expectedly increase the number and rate at which SSD tier blocks are classified as cold. In such an embodiment, cold content stored on a first block of the SSD tier can be demoted to the HDD tier thereby freeing the first block of the SSD tier. In at least one embodiment, the down-tiering rate can be compared to an allocation rate or consumption demand rate at which free blocks of the SSD tier are used to store newly written content. The down-tiering rate can be deemed insufficient if the allocation rate is equal to or greater than the down-tiering rate. In at least one embodiment in a log-based system where write I/O operations are recorded in a log, the allocation rate or demand rate can correspond to a flush rate at which recorded write I/Os are flushed from the log to the SSD tier. In at least one embodiment, free blocks in a tier such as the SSD tier can be generated by demoting cold content of a single SSD tier PLB to the HDD tier. Free blocks in a tier such as the SSD tier can be generating by compaction or combining and moving content of multiple partially filled source PLBs of the SSD tier into a single target PLB of the SSD tier. In at least one embodiment, the content copied from the partially filled source PLBs can all have the same or similar temperature or associated temperature rating or classification.

The foregoing and other aspects of the techniques of the present disclosure are described in more detail in the following paragraphs.

Referring to the FIG. 1, shown is an example of an embodiment of a SAN10 that is used in connection with performing the techniques described herein. The SAN 10 includes a data storage system 12 connected to the host systems (also sometimes referred to as hosts) 14a-14n through the communication medium 18. In this embodiment of the SAN 10, the n hosts 14a-14n access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, a network, or other wireless or other hardwired connection(s) by which the host systems 14a-14n access and communicate with the data storage system 12, and also communicate with other components included in the SAN 10.

Each of the host systems 14a-14n and the data storage system 12 included in the SAN 10 are connected to the communication medium 18 by any one of a variety of connections as provided and supported in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software included in the data storage system 12 are described herein in more detail, and can vary with each particular embodiment. Each of the hosts 14a-14n and the data storage system 12 can all be located at the same physical site, or, alternatively, be located in different physical locations. The communication medium 18 used for communication between the host systems 14a-14n and the data storage system 12 of the SAN 10 can use a variety of different communication protocols such as block-based protocols (e.g., SCSI, FC, iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n issues a data request to the data storage system 12 to perform a data operation. For example, an application executing on one of the host computers 14a-14n performs a read or write operation resulting in one or more data requests to the data storage system 12.

It should be noted that although the element 12 is illustrated as a single data storage system, such as a single data storage array, the element 12 also represents, for example, multiple data storage arrays alone, or in combination with, other data storage devices, systems, appliances, and/or components having suitable connectivity to the SAN 10 in an embodiment using the techniques herein. It should also be noted that an embodiment can include data storage arrays or other components from one or more vendors. In subsequent examples illustrating the techniques herein, reference is made to a single data storage array by a vendor. However, as will be appreciated by those skilled in the art, the techniques herein are applicable for use with other data storage arrays by other vendors and with other components than as described herein for purposes of example.

In at least one embodiment, the data storage system 12 is a data storage appliance or a data storage array including a plurality of data storage devices (PDs) 16a-16n. The data storage devices 16a-16n include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contains no moving mechanical parts. In at least one embodiment, the flash devices can be constructed using nonvolatile semiconductor NAND flash memory. The flash devices include, for example, one or more SLC (single level cell) devices and/or MLC (multi level cell) devices.

In at least one embodiment, the data storage system or array includes different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs are used to manage communications and data operations between one or more host systems and the global memory (GM). In an embodiment, the HA is a Fibre Channel Adapter (FA) or other adapter which facilitates host communication. The HA 21 can be characterized as a front end component of the data storage system which receives a request from one of the hosts 14a-n. In at least one embodiment, the data storage array or system includes one or more RAs used, for example, to facilitate communications between data storage arrays. The data storage array also includes one or more device interfaces 23 for facilitating data transfers to/from the data storage devices 16a-16n. The data storage device interfaces 23 include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths exist between the device interfaces 23, the RAs 40, the HAs 21, and the memory 26. An embodiment, for example, uses one or more internal busses and/or communication modules. In at least one embodiment, the global memory portion 25b is used to facilitate data transfers and other communications between the device interfaces, the HAs and/or the RAs in a data storage array. In one embodiment, the device interfaces 23 performs data operations using a system cache included in the global memory 25b, for example, when communicating with other device interfaces and other components of the data storage array. The other portion 25a is that portion of the memory used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n also through the channels. The host systems 14a-n do not address the drives or devices 16a-16n of the storage systems directly, but rather access to data is provided to one or more host systems from what the host systems view as a plurality of logical devices, logical volumes (LVs) also referred to herein as logical units (e.g., LUNs). A logical unit (LUN) can be characterized as a disk array or data storage system reference to an amount of storage space that has been formatted and allocated for use to one or more hosts. A logical unit has a logical unit number that is an I/O address for the logical unit. As used herein, a LUN or LUNs refers to the different logical units of storage referenced by such logical unit numbers. The LUNs have storage provisioned from portions of one or more physical disk drives or more generally physical storage devices. For example, one or more LUNs can reside on a single physical disk drive, data of a single LUN can reside on multiple different physical devices, and the like. Data in a single data storage system, such as a single data storage array, can be accessible to multiple hosts allowing the hosts to share the data residing therein. The HAs are used in connection with communications between a data storage array and a host system. The RAs are used in facilitating communications between two data storage arrays. The DAs include one or more types of device interfaced used in connection with facilitating data transfers to/from the associated disk drive(s) and LUN(s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system as described can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein are made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a used to manage and monitor the data storage system 12. In one embodiment, the management system 22a is a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration is stored in any suitable data storage entity or structure, such as a database. The data storage system configuration information stored in the database generally describes the various physical and logical entities in the current data storage system configuration. The data storage system configuration information describes, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, data storage system performance information such as regarding various storage objects and other entities in the system, and the like.

Consistent with other discussion herein, management commands issued over the control or management path include commands that query or read selected portions of the data storage system configuration, such as information regarding the properties or attributes of one or more LUNs. The management commands also include commands that write, update, or modify the data storage system configuration, such as, for example, to create or provision a new LUN (e.g., which result in modifying one or more database tables such as to add information for the new LUN), and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN is accessed by the device interface following a data request in connection with I/O operations. For example, a host issues an I/O operation that is received by the HA 21. The I/O operation identifies a target location from which data is read from, or written to, depending on whether the I/O operation is, respectively, a read or a write operation request. In at least one embodiment using block storage services, the target location of the received I/O operation is expressed in terms of a LUN and logical address or offset location (e.g., LBA or logical block address) on the LUN. Processing is performed on the data storage system to further map the target location of the received I/O operation, expressed in terms of a LUN and logical address or offset location on the LUN, to its corresponding physical storage device (PD) and location on the PD. The DA which services the particular PD performs processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique described herein for exemplary purposes. For example, the element 12 of the FIG. 1 in one embodiment is a data storage system, such as a data storage array, that includes multiple storage processors (SPs). Each of the SPs 27 is a CPU including one or more "cores" or processors and each have their own memory used for communication between the different front end and back end components rather than utilize a global memory accessible to all storage processors. In such embodiments, the memory 26 represents memory of each such storage processor.

Generally, the techniques herein can be used in connection with any suitable storage system, appliance, device, and the like, in which data is stored. For example, an embodiment can implement the techniques herein using a midrange data storage system as well as a higher end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path is the logical flow through hardware and software components or layers in connection with issuing data storage management command to and/or from a data storage system, and also receiving responses (possibly including requested data) to such control or management commands. For example, with reference to the FIG. 1, the control commands are issued from data storage management software executing on the management system 22a to the data storage system 12. Such commands, for example, establish or modify data services, provision storage, perform user account management, and the like. Consistent with other discussion herein, management commands result in processing that can include reading and/or modifying information in the database storing data storage system configuration information.

The data path and control path define two sets of different logical flow paths. In at least some of the data storage system configurations, at least part of the hardware and network connections used for each of the data path and control path differ. For example, although both control path and data path generally use a network for communications, some of the hardware and software used can differ. For example, with reference to the FIG. 1, a data storage system has a separate physical connection 29 from a management system 22a to the data storage system 12 being managed whereby control commands are issued over such a physical connection 29. However, user I/O commands are never issued over such a physical connection 29 provided solely for purposes of connecting the management system to the data storage system. In any case, the data path and control path each define two separate logical flow paths.

Figure 2:
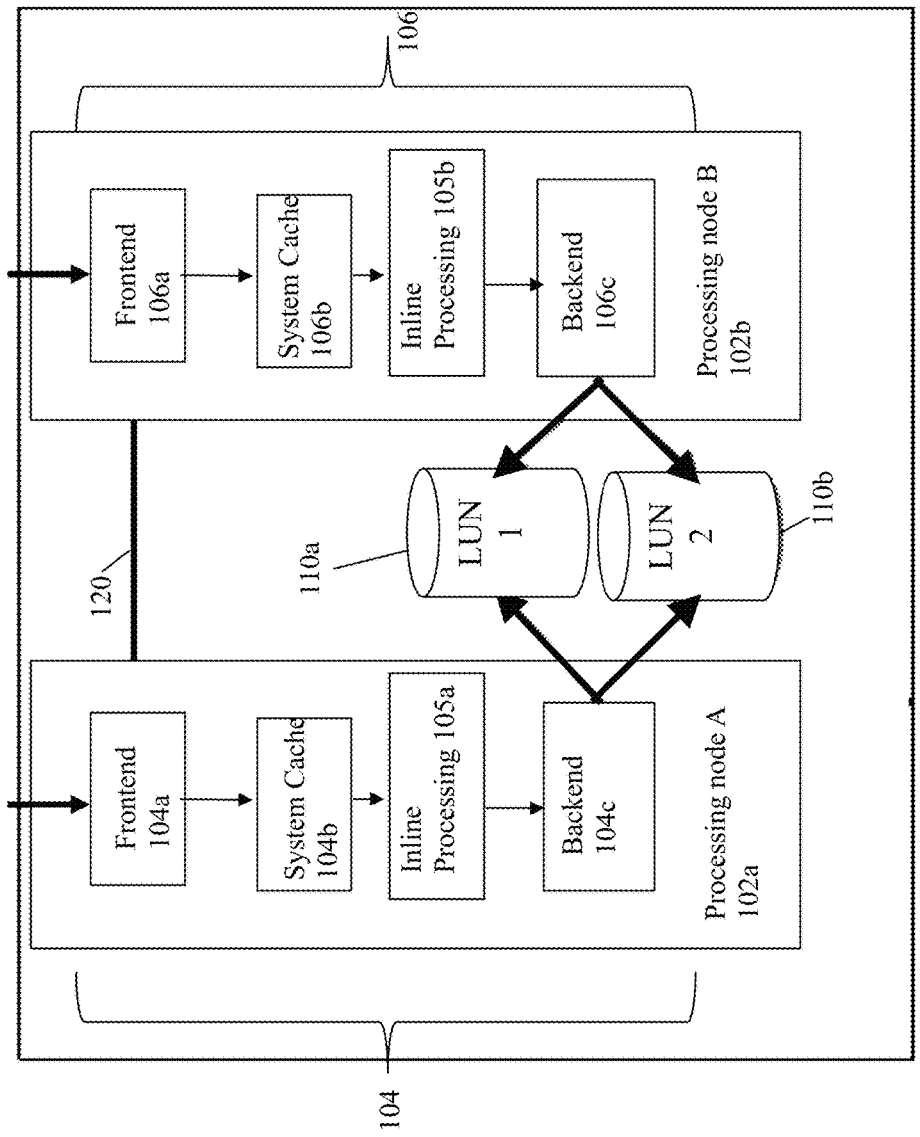
FIG. 2 is an example illustrating the I/O path or data path in connection with processing data in at least one embodiment in accordance with the techniques of the present disclosure.

With reference to the FIG. 2, shown is an example 100 illustrating components that can be included in the data path in at least one existing data storage system in accordance with the techniques of the present disclosure. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes, or more generally I/Os, directed to the LUNs 110a, 110b can be received for processing by either of the nodes 102a and 102b, the example 100 illustrates what can also be referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104*b* and returned to the host. Otherwise, if the requested read data block is not in the system cache 104*b* but is stored on the physical storage 110*a*, 110*b* in its original form, the requested data block is read by the BE component 104*c* from the backend storage 110*a*, 110*b*, stored in the system cache and then returned to the host.

If the requested read data block is not stored in its original form, the original form of the read data block is recreated and stored in the system cache in its original form so that it can be returned to the host. Thus, requested read data stored on physical storage 110*a*, 110*b* can be stored in a modified form where processing is performed by 105*a* to restore or convert the modified form of the data to its original data form prior to returning the requested read data to the host.

Also illustrated in FIG. 2 is an internal network interconnect 120 between the nodes 102*a*, 102*b*. In at least one embodiment, the interconnect 120 can be used for internode communication between the nodes 102*a*, 102*b*.

In connection with at least one embodiment in accordance with the techniques of the present disclosure, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM used as main memory. The processor cache can be substantially faster than the system RAM used as main memory. The processor cache can contain information that the processor will be immediately and repeatedly accessing. The faster memory of the CPU cache can for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105*a*, 105*b* as noted above, data can be loaded from the main memory and/or other lower cache levels into its CPU cache.

In at least one embodiment, the data storage system can be configured to include one or more pairs of nodes, where each pair of nodes can be generally as described and represented as the nodes 102*a-b* in the FIG. 2. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102*a* is the peer node of the node B 102*b*, and the node B 102*b* is the peer node of the node A 102*a*.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes are not shared with other pairs of nodes. A host can access data stored on a BE PD through the node pair associated with or attached to the PD.

In at least one embodiment, each pair of nodes provides a dual node architecture where both nodes of the pair can be generally identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Consistent with other discussion herein, a cache can be used for caching write I/O data and other cached information. In one system, the cache used for caching logged writes can be implemented using multiple caching devices or PDs, such as non-volatile (NV) SSDs such as NVRAM devices that are external with respect to both of the nodes or storage controllers. The caching devices or PDs used to implement the non-volatile cache can be configured in a RAID group of any suitable RAID level for data protection. In at least one embodiment, the caching PDs form a shared non-volatile cache accessible to both nodes of the dual node architecture. It should be noted that in a system where the caching devices or PDs are external with respect to the two nodes, the caching devices or PDs are in addition to other non-volatile PDs accessible to both nodes. The additional PDs provide the BE non-volatile storage for the nodes where the cached data stored on the caching devices or PDs is eventually flushed to the BE PDs as discussed elsewhere herein. In at least one embodiment, a portion of each node's local volatile memory can also be used for caching information, such as blocks or pages of user data and metadata. For example, such node-local cached pages of user data and metadata can be used in connection with servicing reads for such user data and metadata.

In the following paragraphs, the one or more caching devices or PDs may be referred to as a data journal or log used in the data storage system. In such a system, the caching devices or PDs are non-volatile log devices or PDs upon which the log is persistently stored. It should be noted that as discussed elsewhere herein, both nodes can also each have local volatile memory used as a node local cache for storing data, structures and other information. In at least one embodiment, the local volatile memory local to one of the nodes is used exclusively by that one node.

In a data storage system, minimizing the latency of I/O requests is a critical performance metric. In at least one data storage system using the dual node architecture such as described in connection with FIG. 2, for write operations, latency can be affected by the amount of time taken to store the write data in the log where the write data is visible to both nodes or controllers of the system.

Consistent with other discussion herein, the log can be used to optimize write operation latency. Generally, the write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse. The write operation can be recorded in the log in any suitable manner and can include, for example, recording a target logical address to which the write operation is directed and recording the data written to the target logical address by the write operation.

It should be noted that the flushing of the log can be performed in response to an occurrence of any one or more defined conditions. For example, the log can be flushed in response to determining that the amount of reclaimed log space available for use and allocation is less than a specified threshold amount or size.

In the log, each logged operation can be recorded in the next logically sequential record of the log. For example, a logged write I/O and write data (e.g., write I/O payload) can be recorded in a next logically sequential record of the log. The log can be circular in nature in that once a write operation is recorded in the last record of the log, recording of the next write proceeds with recording in the first record of the log.

The typical I/O pattern for the log as a result of recording write I/Os and possibly other information in successive consecutive log records includes logically sequential and logically contiguous writes (e.g., logically with respect to the logical offset or ordering within the log). Data can also be read from the log as needed (e.g., depending on the particular use or application of the log) so typical I/O patterns can also include reads. The log can have a physical storage layout corresponding to the sequential and contiguous order in which the data is written to the log. Thus, the log data can be written to sequential and consecutive physical storage locations in a manner corresponding to the logical sequential and contiguous order of the data in the log. Additional detail regarding use and implementation of the log in at least one embodiment in accordance with the techniques of the present disclosure is provided below.

Figure 3:
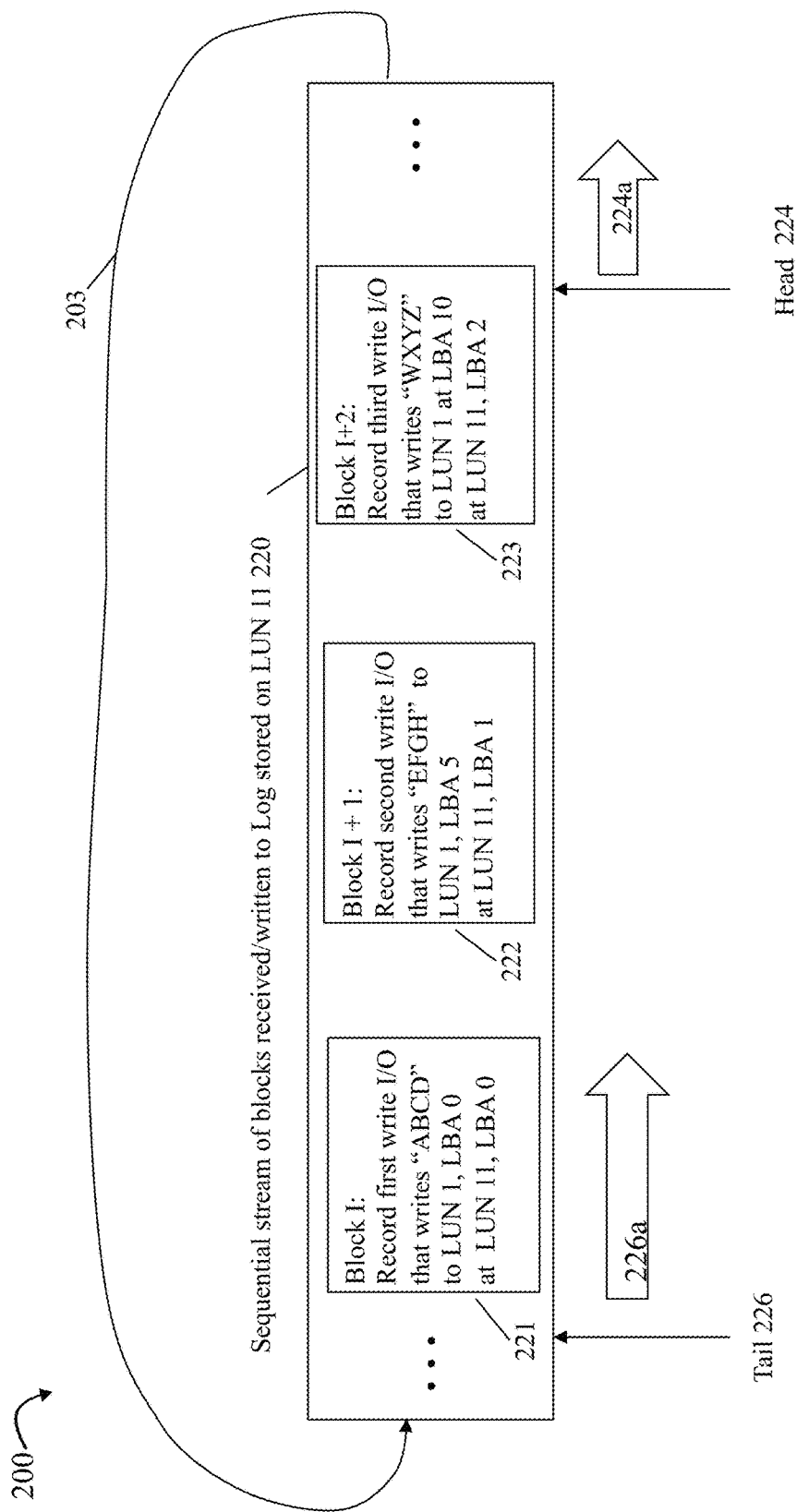
FIGS. 3, 4, 5A and 5B are examples illustrating use of a log in at least one embodiment in accordance with the techniques of the present disclosure.

Referring to FIG. 3, shown is an example 200 illustrating a sequential stream 220 of operations or requests received that are written to a log in an embodiment in accordance with the techniques of the present disclosure. In this example, the log can be stored on the LUN 11 where logged operations or requests, such as write I/Os that write user data to a file, target LUN or other storage object, are recorded as records in the log. The element 220 includes information or records of the log for 3 write I/Os or updates which are recorded in the records or blocks I 221, I+1 222 and I+2 223 of the log (e.g., where I denotes an integer offset of a record or logical location in the log). The blocks I 221, I+1 222, and I+2 223 can be written sequentially in the foregoing order for processing in the data storage system. The block 221 can correspond to the record or block I of the log stored at LUN 11, LBA 0 that logs a first write I/O operation. The first write I/O operation can write "ABCD" to the target logical address LUN 1, LBA 0. The block 222 can correspond to the record or block I+1 of the log stored at LUN 11, LBA 1 that logs a second write I/O operation. The second write I/O operation can write "EFGH" to the target logical address LUN 1, LBA 5. The block 223 can correspond to the record or block I+2 of the log stored at LUN 11, LBA 2 that logs a third write I/O operation. The third write I/O operation can write "WXYZ" to the target logical address LUN 1, LBA 10. Thus, each of the foregoing 3 write I/O operations logged in 221, 222 and 223 write to 3 different logical target addresses or locations each denoted by a target LUN and logical offset on the target LUN. As illustrated in the FIG. 3, the information recorded in each of the foregoing records or blocks 221, 222 and 223 of the log can include the target logical address to which data is written and the write data written to the target logical address.

The head pointer 224 can denote the next free record or block of the log used to record or log the next write I/O operation. The head pointer can be advanced 224a to the next record in the log as each next write I/O operation is recorded. When the head pointer 224 reaches the end of the log by writing to the last sequential block or record of the log, the head pointer can advance 203 to the first sequential block or record of the log in a circular manner and continue processing. The tail pointer 226 can denote the next record or block of a recorded write I/O operation in the log to be destaged and flushed from the log. Recorded or logged write I/Os of the log are processed and flushed whereby the recorded write I/O operation that writes to a target logical address or location (e.g., target LUN and offset) is read from the log and then executed or applied to a non-volatile BE PD location mapped to the target logical address (e.g., where the BE PD location stores the data content of the target logical address). Thus, as records are flushed from the log, the tail pointer 226 can logically advance 226a sequentially (e.g., advance to the right toward the head pointer and toward the end of the log) to a new tail position. Once a record or block of the log is flushed, the record or block is freed for reuse in recording another write I/O operation. When the tail pointer reaches the end of the log by flushing the last sequential block or record of the log, the tail pointer advances 203 to the first sequential block or record of the log in a circular manner and continue processing. Thus, the circular logical manner in which the records or blocks of the log are processed form a ring buffer in which the write I/Os are recorded.

When a write I/O operation writing user data to a target logical address is persistently recorded and stored in the non-volatile log, the write I/O operation is considered complete and can be acknowledged as complete to the host or other client originating the write I/O operation to reduce the write I/O latency and response time. The write I/O operation and write data are destaged at a later point in time during a flushing process that flushes a recorded write of the log to the BE non-volatile PDs, updates and writes any corresponding metadata for the flushed write I/O operation, and frees the record or block of the log (e.g., where the record or block logged the write I/O operation just flushed). The metadata updated as part of the flushing process for the target logical address of the write I/O operation can include mapping information as described elsewhere herein. The mapping information of the metadata for the target logical address can identify the physical address or location on provisioned physical storage on a non-volatile BE PD storing the data of the target logical address. The target logical address can be, for example, a logical address on a logical device, such as a LUN and offset or LBA on the LUN.

Figure 4:
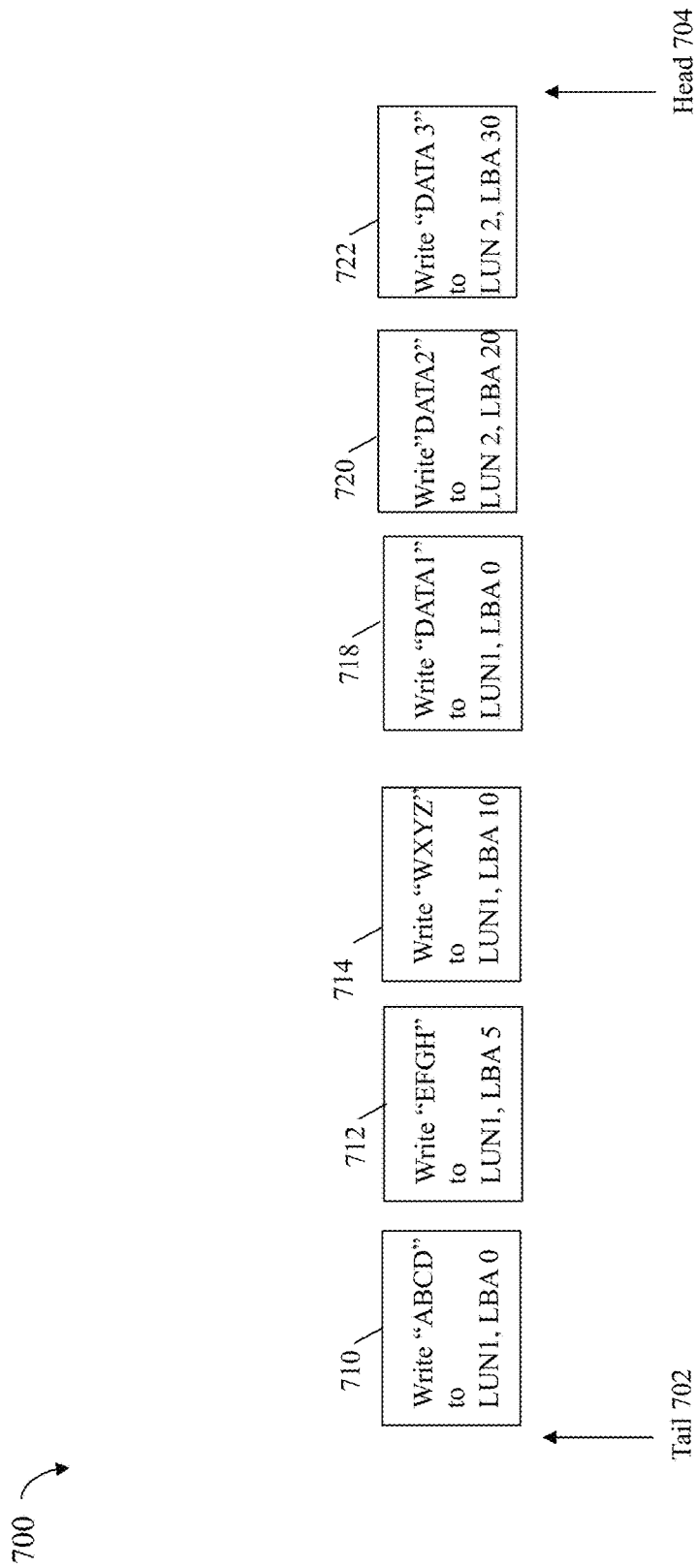

Referring to FIG. 4, shown is an example of information that can be included in a log in an embodiment in accordance with the techniques of the present disclosure.

The example 700 includes the head pointer 704 and the tail pointer 702. The elements 710, 712, 714, 718, 720 and 722 denote 6 records of the log for 6 write I/O operations recorded in the log. The element 710 is a log record for a write operation that writes "ABCD" to the LUN 1, LBA 0. The element 712 is a log record for a write operation that writes "EFGH" to the LUN 1, LBA 5. The element 714 is a log record for a write operation that writes "WXYZ" to the LUN 1, LBA 10. The element 718 is a log record for a write operation that writes "DATA1" to the LUN 1, LBA 0. The element 720 is a log record for a write operation that writes "DATA2" to the LUN 2, LBA 20. The element 722 is a log record for a write operation that writes "DATA3" to the LUN 2, LBA 30. As illustrated in FIG. 4, the log records 710, 712, 714, 718, 720 and 722 can also record the write data (e.g., write I/O operation payload) written by the write operations. It should be noted that the log records 710, 712 and 714 of FIG. 4 correspond respectively to the log records 221, 222 and 223 of FIG. 3.

The log can be flushed sequentially or in any suitable manner to maintain desired data consistency. In order to maintain data consistency when flushing the log, constraints can be placed on an order in which the records of the log are flushed or logically applied to the stored data while still allowing any desired optimizations. In some embodiments, portions of the log can be flushed in parallel in accordance with any necessary constraints needed in order to maintain data consistency. Such constraints can consider any possible data dependencies between logged writes (e.g., two logged writes that write to the same logical address) and other logged operations in order to ensure write order consistency.

Figure 5A:
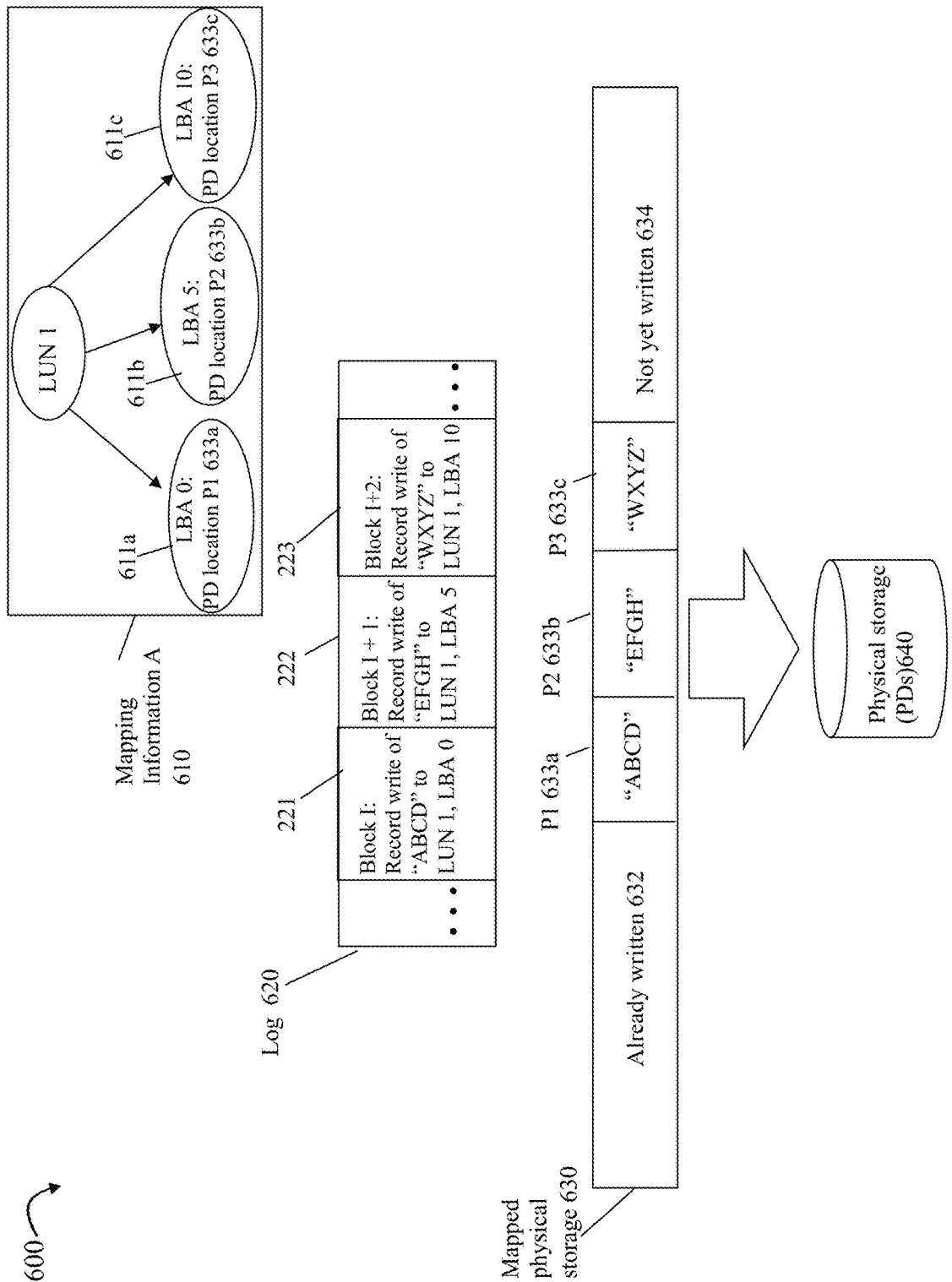

Referring to FIG. 5A, shown is an example 600 illustrating the flushing of logged writes and the physical data layout of user data on BE PDs in at least one embodiment in accordance with the techniques of the present disclosure. FIG. 5A includes the log 620, the mapping information A 610, and the physical storage (i.e., BE PDs) 640. The element 630 represents the physical layout of the user data as stored on the physical storage 640. The element 610 can represent the logical to physical storage mapping information A 610 created for 3 write I/O operations recorded in the log records or blocks 221, 222 and 223.

The mapping information A 610 includes the elements 611a-c denoting the mapping information, respectively, for the 3 target logical address of the 3 recorded write I/O operations in the log records 221, 222, and 223. The element 611a of the mapping information denotes the mapping information for the target logical address LUN1, LBA 0 of the block 221 of the log 620. In particular, the block 221 and mapping information 611a indicate that the user data "ABCD" written to LUN 1, LBA 0 is stored at the physical location (PD location) P1 633a on the physical storage 640. The element 611b of the mapping information denotes the mapping information for the target logical address LUN1, LBA 5 of the block 222 of the log 620. In particular, the block 222 and mapping information 611b indicate that the user data "EFGH" written to LUN 1, LBA 5 is stored at the physical location (PD location) P2 633b on the physical storage 640. The element 611c of the mapping information denotes the mapping information for the target logical address LUN 1, LBA 10 of the block 223 of the log 620. In particular, the block 223 and mapping information 611 indicate that the user data "WXYZ" written to LUN 1, LBA 10 is stored at the physical location (PD location) P3 633c on the physical storage 640.

The mapped physical storage 630 illustrates the sequential contiguous manner in which user data can be stored and written to the physical storage 640 as the log records or blocks are flushed. In this example, the records of the log 620 can be flushed and processing sequentially (e.g., such as described in connection with FIG. 3) and the user data of the logged writes can be sequentially written to the mapped physical storage 630 as the records of the log are sequentially processed. As the user data pages of the logged writes to the target logical addresses are written out to sequential physical locations on the mapped physical storage 630, corresponding mapping information for the target logical addresses can be updated. The user data of the logged writes can be written to mapped physical storage sequentially as follows: 632, 633a, 633b, 633c and 634. The element 632 denotes the physical locations of the user data written and stored on the BE PDs for the log records processed prior to the block or record 221. The element 633a denotes the PD location P1 of the user data "ABCD" stored at LUN 1, LBA 1. The element 633b denotes the PD location P2 of the user data "EFGH" stored at LUN 1, LBA 5. The element 633c denotes the PD location P3 of the user data "WXYZ" stored at LUN 1, LBA 10. The element 634 denotes the physical locations of the user data written and stored on the BE PDs for the log records processed after the block or record 223.

In one aspect, the data layout (e.g., format or structure) of the log-based data of the log 620 as stored on non-volatile storage can also be physically sequential and contiguous where the non-volatile storage used for the log can be viewed logically as one large log having data that is laid out sequentially in the order it is written to the log.

The data layout of the user data as stored on the BE PDs can also be physically sequential and contiguous. As log records of the log 620 are flushed, the user data written by each flushed log record can be stored at the next sequential physical location on the BE PDs. Thus, flushing the log can result in writing user data pages or blocks to sequential consecutive physical locations on the BE PDs. In some embodiments, multiple logged writes can be flushed in parallel as a larger chunk to the next sequential chunk or portion of the mapped physical storage 630.

Consistent with other discussion herein, the mapped physical storage 630 can correspond to the BE PDs providing BE non-volatile storage used for persistently storing user data as well as metadata, such as the mapping information. With a log-structured system as discussed herein, recorded writes in the log are processed as corresponding entries are flushed from the log, where the data written by the writes (as recorded in the log) is stored at new physical storage locations on the BE PDs which is illustrated in further detail below with reference to FIG. 5B. Thus, one characteristic of log structured systems (LSSs) is that updates do not overwrite the existing copy, such as of user data written by a write operation. Rather, the updated or new data written at a target logical address can be stored at a next sequential location in the log and also in a next sequential physical storage location on the BE PDs. In an LSS of the data storage system in at least one embodiment, the physical storage 630 denoting the physical storage of the BE PDs can also be implemented and managed as a logical circular log in a manner similar to that as described in connection with the log of FIGS. 3, 4 and 5A containing the data prior to being flushed to the physical storage 630 of the BE PDs.

Figure 5B:
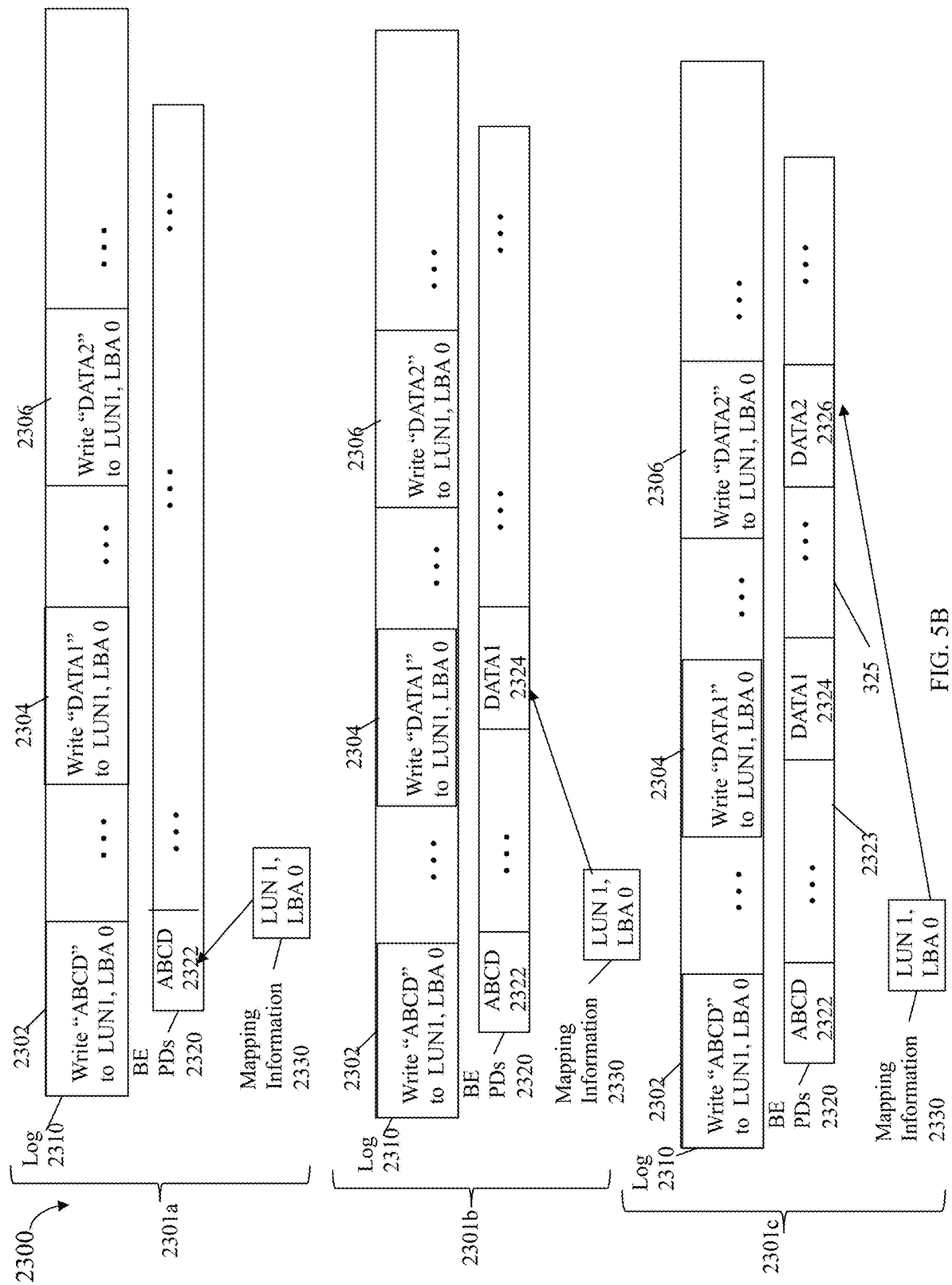

For example with reference to FIG. 5B, the element 2301*a* can denote the state of the log file 2310, BE PDs 2320 and mapping information 2330 at a first point in time T1 after processing the record 2302 for a first write of "ABCD" to the logical address LUN A, LBA 0. The data written "ABCD" by the recorded write of 2302 can be stored at the BE PD location 2322. Thus, flushing the log record 2302 results in storing the write data "ABCD" to the BE PD location 2322 and additionally updating the mapping information 2330 to reference the BE PD location 2322. The mapping information 2330 denotes the metadata used to map the logical address LUN 1, LBA 0 to the current physical location on the BE PDs containing the user data or content stored at the logical address LUN 1, LBA 0. After the log record 2302 is flushed from the log 2310, the record 2302 is available and can be subsequently reclaimed for reuse for logging other operations in the log 2310.

At a second point in time T2 subsequent to T1, the log record 2304 can be processed and flushed to the BE PDs 2320. The element 2301*b* denotes the state of the log file 2310, BE PDs 2320 and mapping information 2330 at the second point in time T2 after processing the record 2304 for a second write of "DATA1" to the logical address LUN A, LBA 0. The data written "DATA1" by the recorded write of 2304 can be stored at the BE PD location 2324. Thus, flushing the log record 2304 results in storing the write data "DATA1" to the BE PD location 2324 and additionally updating the mapping information 2330 to reference the BE PD location 2324 denoting the physical location containing the data stored at the LUN 1, LBA 0 at the time T2. Additionally, the PD location 2322 can be invalidated since it no longer contains valid current data for the logical address LUN 1, LBA 0, whereby the PD location 2322 can be available for reuse. After the log record 2304 is flushed from the log 2310, the record 2304 is available and can be subsequently reclaimed for reuse for logging other operations in the log 2310.

At a third point in time T3 subsequent to T2, the log record 2306 can be processed and flushed to the BE PDs 2320. The element 2301*c* denotes the state of the log file 2310, BE PDs 2320 and mapping information 2330 at the third point in time T3 after processing the record 2306 for a third write of "DATA2" to the logical address LUN A, LBA 0. The data written "DATA2" by the recorded write of 2306 can be stored at the BE PD location 2326. Thus, flushing the log record 2306 results in storing the write data "DATA2" to the BE PD location 2326 and additionally updating the mapping information 2330 to reference the BE PD location 2326 denoting the physical location containing the data stored at the LUN 1, LBA 0 at the time T3. Additionally, the PD location 2324 can be invalidated since it no longer contains valid current data for the logical address LUN 1, LBA 0, whereby the PD location 2324 can be available for reuse. After the log record 2306 is flushed from the log 2310, the record 2306 is available and can be subsequently reclaimed for reuse for logging other operations in the log 2310.

As illustrated by the elements 2301*a-c*, over time, the physical storage locations 2322, 2324 of the BE PDs 2320 become free and available for reuse. The other physical storage locations 2323, 2325 and 2326 can still contain valid data. Thus, the free, available reusable physical storage locations 2322, 2324 can form holes or segments interspersed among the other portions 2323, 2325, 2326 containing valid data. More generally, the size of the holes 2322, 2324 can be of varying sizes and can include multiple user data blocks or pages. Additionally, portions of physical storage of the BE PDs can also be similarly allocated and then freed for reuse for other purposes. Thus, the holes of free, reusable physical storage as well other portions of physical storage including valid data can result not only from flushing the log file but also from other purposes that can vary with embodiment.

FIG. 5B illustrates the general operation of an LSS where the log is used to record write I/O operations and the written data of each write operation can be stored at a new physical storage location. Additionally, FIG. 5B illustrates overwriting of the same logical address by multiple write I/Os where each such write I/O can write new data to the same logical address. In an LSS, even with overwriting the same logical address, the write data of each write I/O to the logical address can be stored at a new physical storage location rather than overwriting an existing physical storage location including the content of the logical address prior to the write I/O.

In at least one embodiment, a metadata (MD) structure of mapping information can be used in accordance with the techniques herein.

The mapping information (e.g., such as mapping information 610) can be used, for example, to map a logical address, such as a LUN and an LBA or offset, to its corresponding storage location, such as a physical storage location on BE non-volatile PDs of the system. Consistent with discussion elsewhere herein, write requests or operations stored in the log can be flushed to the BE PDs (non-volatile) providing storage locations for the written data. For example, a logged write operation that writes first data to a logical address can be flushed whereby the logged first data is written out to a physical storage location on a BE PD. The mapping information can be used to map the logical address to the physical storage location containing the content or data stored at the logical address. In at least one embodiment, the mapping information includes a MD structure that is hierarchical structure of multiple layers of MD pages or blocks.

Figure 6A:
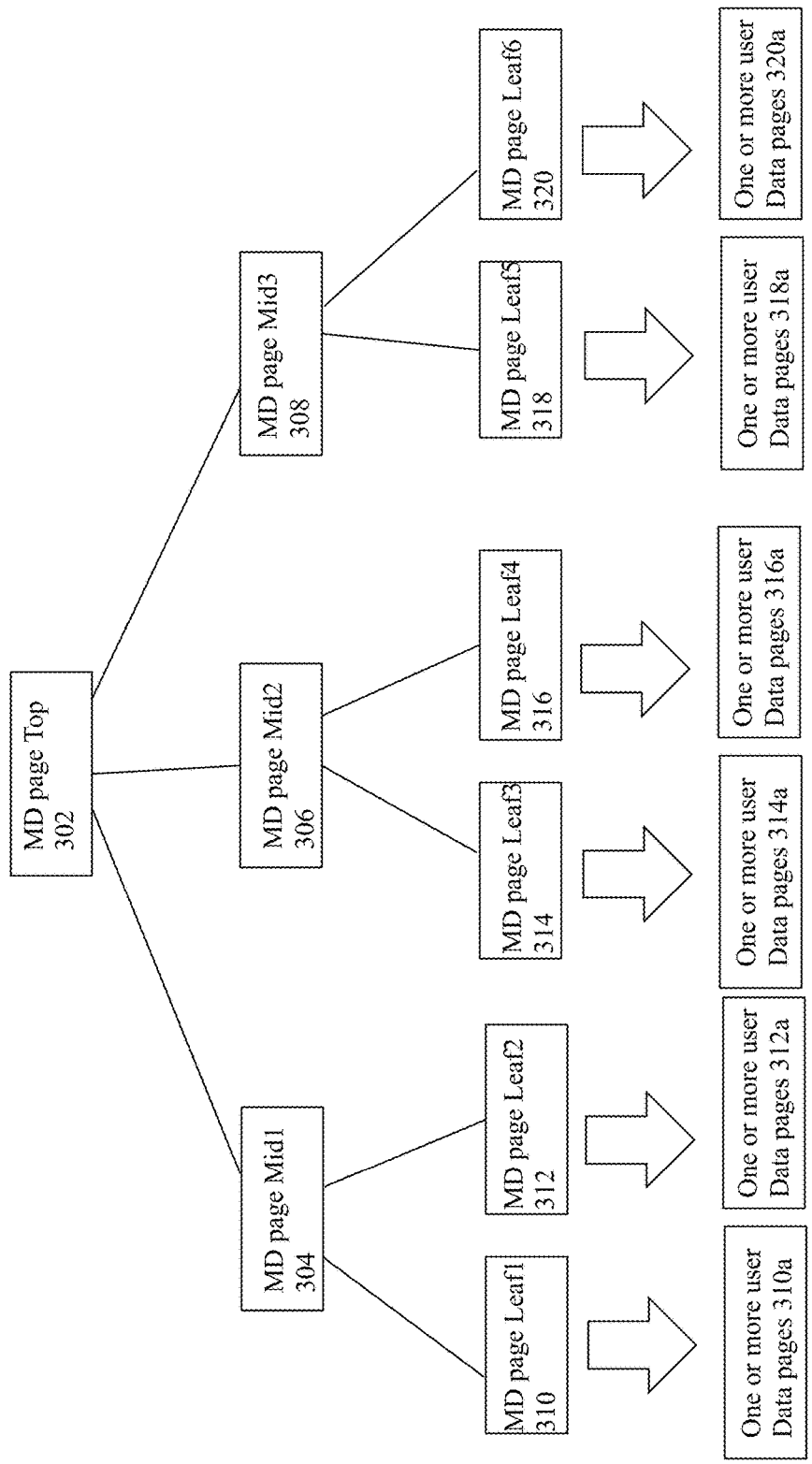
FIGS. 6A, 6B, 6C and 6D are examples of mapping information in the form of a metadata structure that can be used in connection with mapping logical addresses to physical addresses or storage locations in at least one embodiment in accordance with the techniques of the present disclosure.

In at least one embodiment, the mapping structure for a LUN, such as a LUN A, can be in the form of a tree having a plurality of levels of MD pages. More generally, the mapping structure can be in the form of any ordered list or hierarchical structure. In at least one embodiment, the mapping structure for the LUN A can include LUN MD in the form of a tree having 3 levels including a single top or root node (TOP node), a single mid-level (MID node) and a bottom level of leaf nodes (LEAF nodes), where each of the MD page leaf nodes can point to, or reference (directly or indirectly) one or more pages of stored data, such as user data stored on the LUN A. Each node in the tree corresponds to a MD page including MD for the LUN A. More generally, the tree or other hierarchical structure of various MD pages of the mapping structure for the LUN A can include any suitable number of levels, such as more than 3 levels where there are multiple mid-levels. In at least one embodiment the tree of MD pages for the LUN can be a B+ tree, also sometimes referred to as an "N-ary" tree, where "N" indicates that each node in the tree structure can have up to a maximum of N child nodes. For example, in at least one embodiment, the tree of MD pages for the LUN can specify N=512 whereby each node in the tree structure can have up to a maximum of N child nodes. For simplicity of illustration, the tree structure of MD pages, corresponding to the mapping structure in at least one embodiment, is represented in FIG. 6A as including only 3 levels where each node in the tree can have at most 3 child nodes. Generally, the techniques herein can be used with any layered or hierarchical structure of MD pages.

Referring to FIG. 6A, shown is an example 300 of a tree of MD pages that can be used in an embodiment in accordance with the techniques herein. The example 300 includes a tree of MD pages denoting the mapping structure as discussed above with 3 levels—a top or root level, level 1, including a single MD TOP page; a single mid or middle level, level 2, of MD MID pages; and a bottom level, level 3, of leaf nodes of MD LEAF pages. In the example 300, the top or root level, level 1, includes MD page 302; the mid or middle level, level 2, includes MD pages 304, 306 and 308; and the bottom level, level 3, includes MD pages 310, 312, 314, 316, 318 and 320, which can also be referred to as leaf nodes. As also illustrated in the example 300, each of the leaf MD pages in level 3 of the tree points to, or references (e.g., directly or otherwise indirectly using one more additional levels of indirection of pointers not illustrated) one or more user data pages or blocks including data stored at various LBAs of a LUN such as the LUN A. For example, MD pages 310, 312, 314, 316, 318 and 320 point or reference, respectively, one or more UD pages 310a, 312a, 314a, 316a, 318a and 320a.

The links or connections between a parent node (at level M) and its one or more child nodes (at level M+1) in the tree 300 generally represent mappings between the parent node and the one or more child nodes. In at least one embodiment, the parent node can include a reference used to access (directly or indirectly) each of its one or more child nodes. For example, the root node MD page top 302 can include addresses or pointers used to access each of its child nodes 304, 306 and 308. The mid-level node MD page mid1 304 can include addresses or pointers used to access each of its child leaf nodes 310, 312. The mid-level node MD page mid 306 can include addresses or pointers used to access each of its child leaf nodes 314, 316. The mid-level node MD page mid 308 can include addresses or pointers used to access each of its child leaf nodes 318, 320.

In at least one embodiment, each of the addresses or pointers included in a MD page that references a location in another MD page or references a location in a UD page can be a physical storage location on the back-end PDs. Thus, the traversal between connected nodes of the structure 300 can correspond to traversing physical address or storage locations included in pages or nodes that are parent nodes.

In connection with accessing a particular UD page in at least one embodiment, all MD pages in a path from the root or top level of the tree to the UD page can be traversed in a consecutive serialized order in which such pages appear in the path traversal down the path from the top or root level to the UD page accessed using a particular one of the MD page leaf nodes. For example, assume UD page or block X is included in the set of UD pages 312a. In order to access UD page X of 312a, the following denotes the consecutive serialized order in which the MD pages forming a sequence are accessed: MD page top 302, MD page mid1 304, and MD page leaf2 312. Generally, in at least one embodiment, each of the MD pages can include pointers or addresses to locations of one or more child pages or nodes. Thus, the foregoing traversal of MD pages denotes the sequence of MD pages that are processed in consecutive serialized order in order to access the particular UD page, such as UD page X. In order to access the UD page X as stored on PDs where UD page X includes first data needed to service a read I/O operation in connection with a cache miss of the first data, each of the MD pages in the foregoing sequence (e.g., MD page top 302, MD page mid1 304, and MD page leaf2 312) needs to be accessed in consecutive serialized order. In at least one embodiment, the sequence of MD pages, and more generally, the path from the MD page top to the UD page X, forms a linked list of nodes of pages. In at least one embodiment, each parent node or MD page of the structure 300 can generally include multiple pointers or references to locations of its child nodes or pages. For example, MD page top 302 includes pointers to locations of its child nodes, MD pages 304, 306 and 308. MD page mid2 306 includes pointers to locations of its child nodes, MD pages 314 and 316.

The data pages 310a, 312a, 314a, 316a, 318a and 320a include UD stored on particular logical addresses of a LUN's address space, such as the LUN A's logical address space. In at least one embodiment each MD leaf can hold MD for a specified number of LBAs of a LUN. For example, in one embodiment each MD leaf can hold MD for 512 LBAs. For example, with reference to FIG. 6A, the data pages 310a, 312a, 314a, 316a, 318a and 320 each include user data stored on particular logical addresses of the LUN A's logical address space. It may be, for example, that element 310a includes user data stored at a first set of LBAs 0-511; and that element 312a includes user data stored at a second set of LBAs 512-1023. Generally, the particular LBAs of the LUN mapped to each MD page can vary with embodiment. For example, in at least one embodiment, consecutive sequential subranges of the LUN's logical address space can be mapped to the MD page leaves. Additionally, when the tree is traversed in a depth first manner, the MD page leaves can correspond to consecutive sequential subranges. For example, the element 310a denotes data pages for LBAs 0-511; the element 312a denotes data pages for the LBAs 512-1023; the element 314*a* denotes data pages for LBAs 1024-1535; the element 316*a* denotes data pages for LBAs 1536-2047, and so on.

As generally known in the art, a depth-first traversal is an algorithm for traversing or tree or graph data structures. The algorithm starts at the root node (selecting some arbitrary node as the root node in the case of a graph) and explores as far as possible along each path extending from the root to a leaf node before backtracking up the path to find a yet another unexplored path. In at least one embodiment, traversal of the tree 300 of MD pages in a depth-first manner explores all paths, in sequential order, from the left-most path to the right most path as arranged in the tree.

In at least one embodiment, when the structure 300 is traversed in a depth first manner (i.e., from the left-most path to the right most path as arranged in the tree), the MD page leaf nodes that occur in the depth first traversal correspond to consecutive sequential LBA subranges of a LUN. In at least one embodiment, when the overall tree including MD page top node 302 and all its descendant nodes are traversed in this depth first manner, the MD page leaf nodes that occur in the depth first traversal correspond to consecutive sequential LBA subranges of a LUN.

In at least one embodiment as described herein, each of the MD pages and data blocks in the example 300 can be of a predetermined size and each of the MD pages can hold a known number of entries containing pointer or address values. In such a case and in combination with the correspondence of sequential consecutive LBA ranges of each MD leaf page, an embodiment can perform a calculation to determine the MD page at a particular level that is accessed in the tree MD mapping structure 300 to determine the data block for a particular LUN and LBA. Similarly, it is a straightforward mathematical calculation to determine the index, offset of entry in a particular page or node to be accessed in connection with obtaining data blocks stored at the particular LUN and LBAs of the LUN. Each MD page in 300 can be known to include MD relevant for accessing data on a particular LUN and one or more LBAs of that LUN. For example, consistent with discussion above, the element 310*a* denotes the data blocks for LBAs 0-511 of a LUN. In order to access the data block for an LBA of the LUN in the LBA subrange 0-511, MD pages 302, 304 and 310 can be traversed in sequential order. In particular, the first entry or offset of the MD page top 302 can contain the address of the MD page mid 1 304; the first entry or offset of the MD page mid 1 304 can contain the address of the MD page leaf 1 310; and the first entry or offset of the MD page leaf 1 310 can contain the address of one of the data blocks of 310*a*.

In a similar manner, a mapping can be made regarding what MD pages of the structure 300 and entries thereof are used in connection with obtaining data blocks containing data for any particular LUN and LBA. In at least one embodiment, the particular MD pages used to access a data block including data for a particular LUN and LBA can be known based on such mappings and correspondence of LBA subranges to particular MD leaf pages.

Figure 6B:
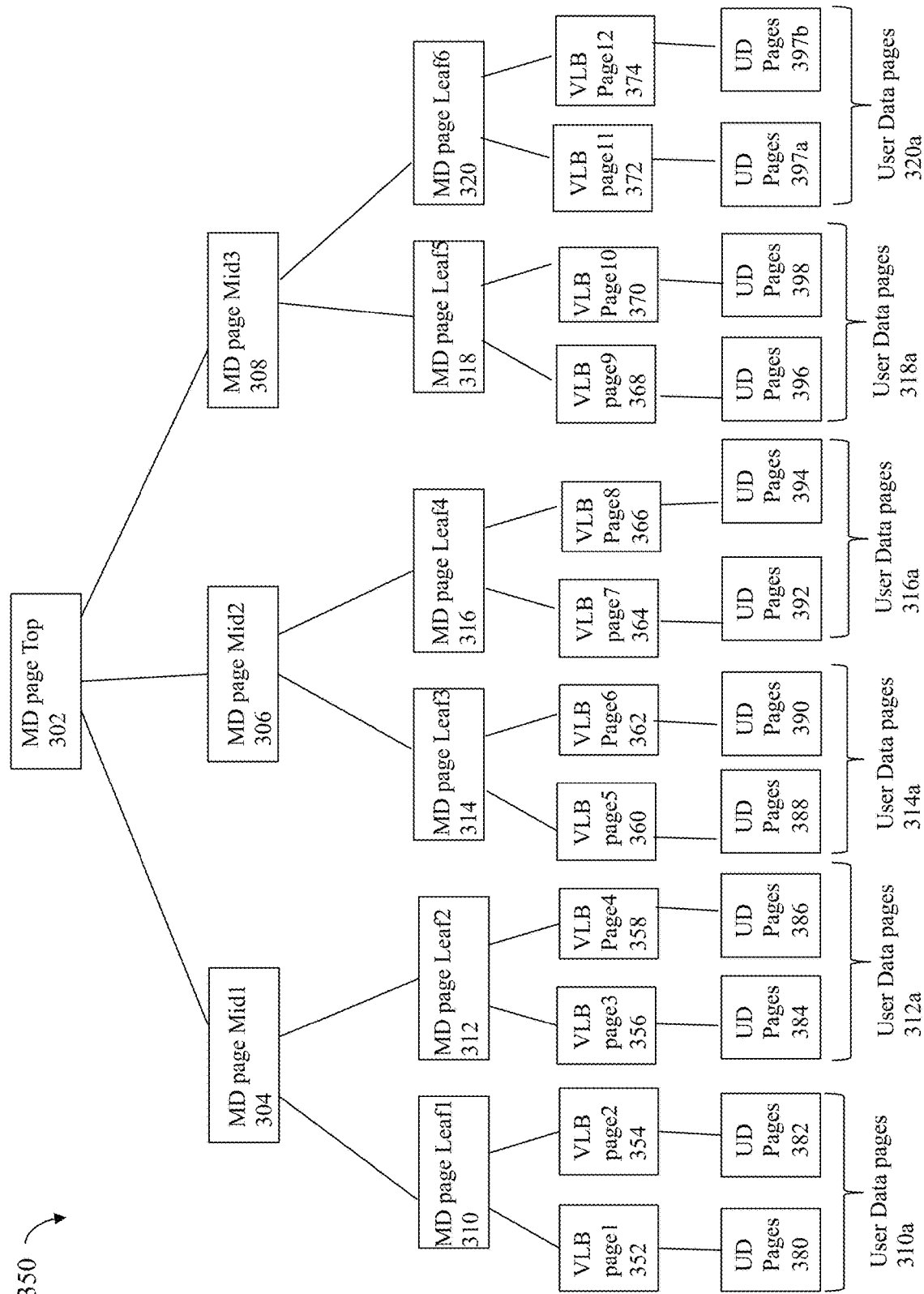

Referring to FIG. 6B, shown is a more detailed version of a hierarchical structure used as the mapping structure 108 that can be used in an embodiment in accordance with the techniques of the present disclosure. The structure 350 is similar to the structure 300 as described and illustrated in FIG. 6A with the added difference that more detail is provided regarding the intervening layer of VLB (virtual layer block) MD pages between the MD page leaves and the UD pages. Thus, in such an embodiment, the structure 350 includes 4 levels of MD pages as opposed to the possible 3 levels as allowed in the more generalized structure 300 represented in FIG. 6A. In this case, each sequence of MD pages traversed in a path from the MD page top or root to access a particular UD page includes 4 MD pages—MD page top 302, one of the MD page Mid nodes (e.g., one of 304, 306 or 308), one of the MD page leaf nodes (e.g., one of 310, 312, 314, 316, 318 and 320), and one of the VLB pages (e.g., one of 352, 354, 356, 358, 360, 362, 364, 366, 368, 370, 372 and 374).

In at least one embodiment, the use of VLBs as a layer in the hierarchy between the MD leaf nodes and the UD pages can be used to facilitate different data storage services, such as relocating UD between different physical storage location, data deduplication, and the like. An entry of the VLB associated with a particular physical storage location can be remapped without requiring remapping of a MD leaf to the UD page.

The UD pages 380 and 382 denote two portions of UD pages corresponding to UD pages 310*a* of FIG. 6A including data for LBAs 0-511. The UD pages 384 and 386 denote two portions of UD pages corresponding to UD pages 312*a* of FIG. 6A including data for LBAs 512-1023. The UD pages 388 and 390 denote two portions of UD pages corresponding to UD pages 314*a* of FIG. 6A including data for LBAs 1024-1535. The UD pages 392 and 394 denote two portions of UD pages corresponding to UD pages 316*a* of FIG. 6A including data for LBAs 1536-2047. The UD pages 396 and 398 denote two portions of UD pages corresponding to UD pages 318*a* of FIG. 6A including data for LBAs 2048-2559. The UD pages 397*a* and 397*b* denote two portions of UD pages corresponding to UD pages 320*a* of FIG. 6A including data for LBAs 2560-3072.

In furtherance of the example above regarding UD page X and now with reference to FIG. 6B, assume more specifically that UD page X is located in the set of UD pages denoted by 384. In this case, the MD page sequence including the MD pages traversed in order to access UD page X 384 includes MD page 302, MD page 304, MD page 312, and VLB page3 356.

Figure 6C:
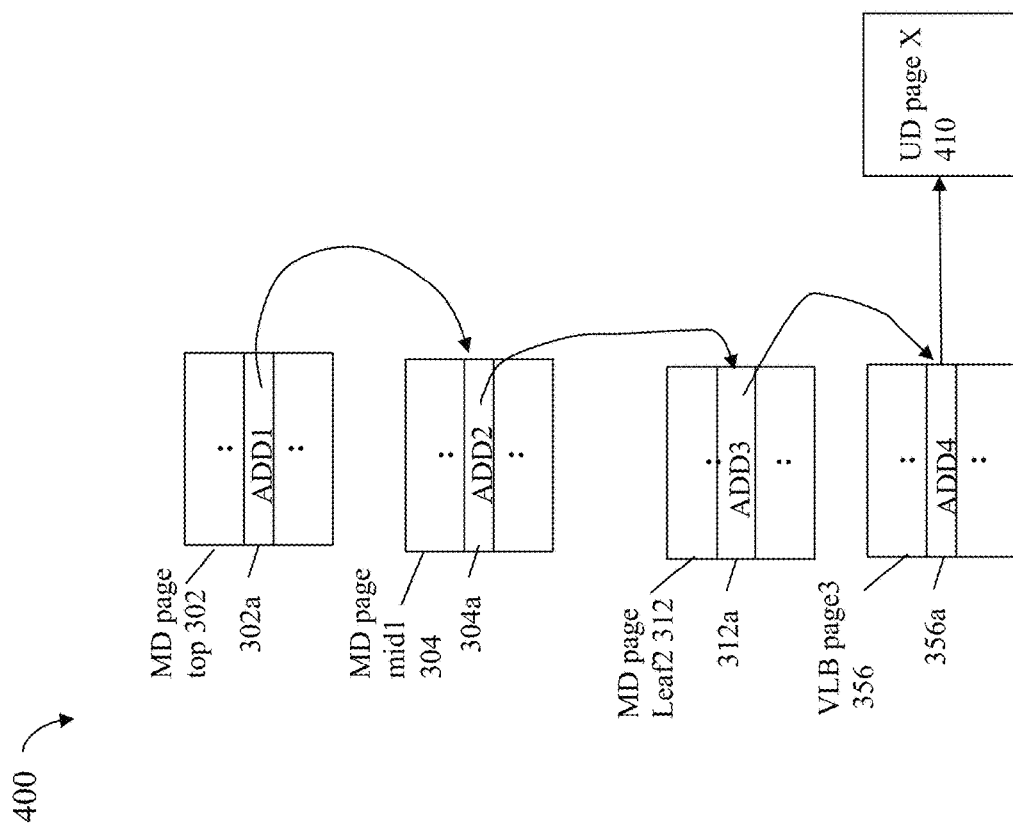

Referring to FIG. 6C, shown is a more detailed representation 400 of the MD pages of the sequence traversed to access the UD page X 384 included in the set of UD pages 312*a*. As noted above, the MD page sequence includes MD page 302, MD page 304, MD page 312, and VLB page3 356. In the example 400, MD page top 302 includes an entry or address 302*a* that points to or references the location 304*a* in the MD page mid1 304. In at least one embodiment, the starting entry 302*a* in the first MD page 302 of the sequence can be determined based on the logical address including the desired UD stored in a page or block of storage (e.g., physical non-volatile storage location on the BE PDs of the system). For example, assume processing is performed to read the UD for LUN A, LBA 514 located in UD page X. In at least one embodiment, the logical address LUN A, LBA 514 can be used to determine the particular structure instance and thus the particular MD page top 302 to access. The LBA 514 of the logical address of the UD can also be used to determine an index or offset into the MD page 302 to determine the relevant entry, location or address 302*a* having a pointer, address or reference to an entry in the next MD page in the sequence to access the desired page including the UD for LUN A, LBA 514. An embodiment can generally use any suitable technique to map a corresponding logical address, such as an LBA of a particular LUN, to an entry in the top level MD page 302.

The MD page top 302 can be accessed and read from a PD to obtain the address or pointer ADD1 from location 302*a*. If the MD page 302 is already in cache, the cached copy can be used to obtain the address or pointer ADD1 from the location 302*a*. The address or pointer ADD1 of location 302*a* can then be used to identify the entry 304*a* of the particular mid level MD page, such as MD page mid1 304, that is accessed next in the sequence.

Continuing with the example 400, the MD page mid1 304 can be accessed where the location 304*a* is read to obtain the address or pointer ADD2 from location 304*a*. The address or pointer ADD2 can then be used to identify the entry 312*a* of a particular leaf level MD page, such as MD page leaf2 312, that is next accessed in the sequence. If the MD page mid1 304 is not in cache, the on-disk copy of the MD page 304 on a PD can be accessed to read the address or pointer ADD2 from the location 304*a*. The address or pointer ADD2 identifies location 312*a* of the MD page leaf 2 312. If the MD page 312 is not already in cache, the on-disk copy of the MD page 312 on a PD can be read to obtain the content of location 312*a*. The location 312*a* of the MD page leaf2 312 can be accessed and read to obtain the address or pointer ADD3 from location 312*a*. The address or pointer ADD3 can then be used to identify a particular entry of a VLB page, such as the entry 356*a* of the VLB page3 356, that is next accessed in the sequence. Thus, ADD3 can denote the location or address of the entry 356*a* in the VLB page 3 356.

If the VLB page 356 is not already in cache, the on-disk copy of the VLB page 356 on a PD can be read to obtain the content of location 356*a*. The location 356*a* of the VLB page 3 356 can be accessed and read to obtain the address or pointer ADD4 from the location 356*a*. The address or pointer ADD4 can then be used to identify the particular UD page X 410 where the UD page X can next be read. If the UD page X is not in cache, the on-disk copy of the UD page X can be read in from a PD.

The example 400 of FIG. 6C includes the path or traversal of MD pages in the structure 350 from the MD page root or top 302 to the UD page X of 384 including the desired UD for the logical address LUN A, LBA 514. The path or traversal of MD pages 302, 304, 312, 356 and 384 denotes the sequence of MD pages read and accessed in order to obtain the UD page X of 384.

Figure 6D:
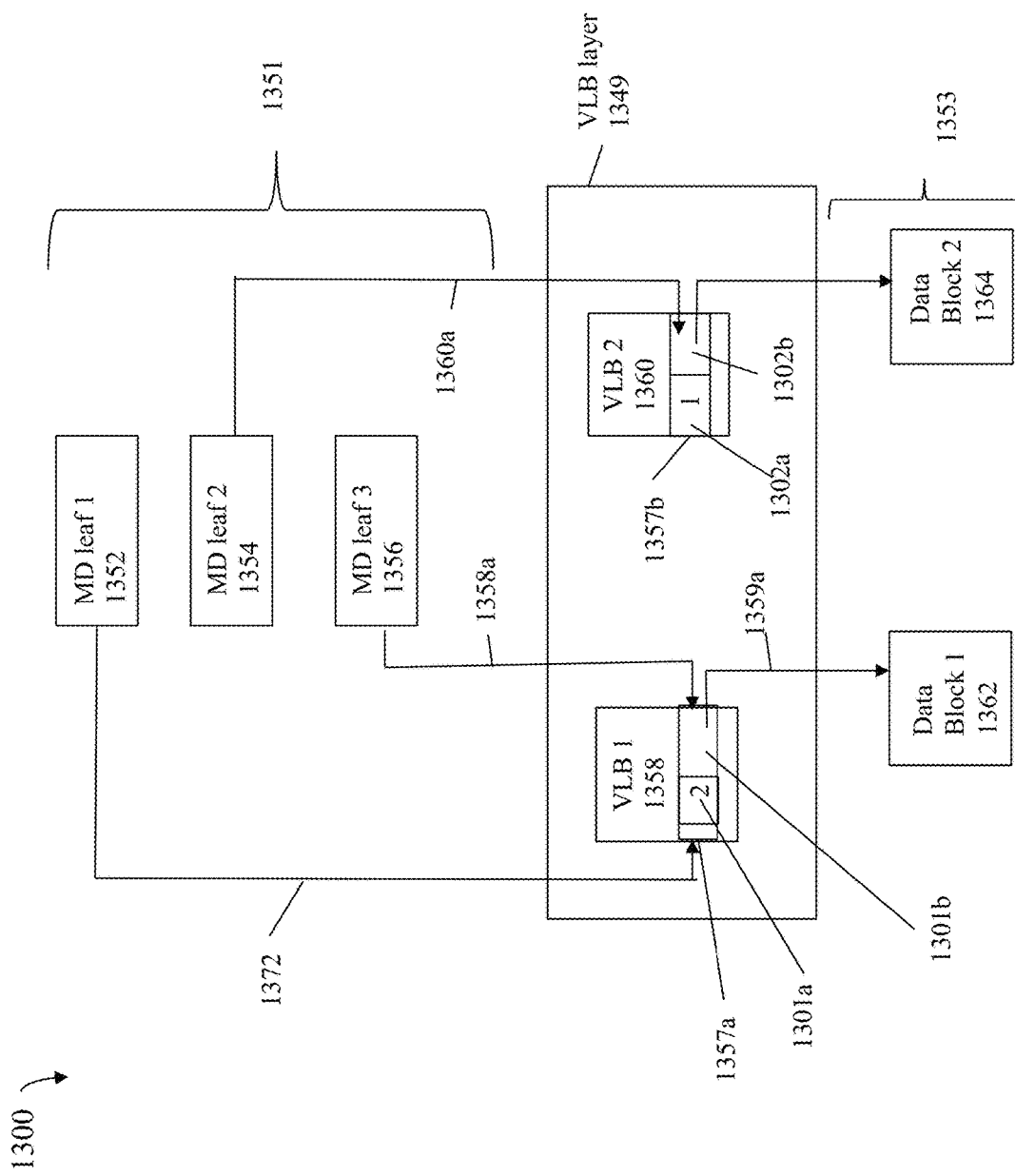

Referring to FIG. 6D, shown is an example illustrating in more detail a particular embodiment in which a VLB layer of multiple VLBs is the intervening layer between the MD leaf nodes of the mapping structure 108 and the data blocks. The elements 1352, 1354 and 1356 can denote 3 MD leaf nodes included in a MD leaf layer of a MD mapping structure such as described herein (e.g., in FIGS. 6A-C). The elements 1358 and 1360 denote 2 VLBs included in the intervening VLB layer 1349 between MD leaf nodes 1351 and data blocks 1353. The elements 1362 and 1364 denote 2 data blocks each storing unique content such as user data stored at logical addresses. In the example 1300, the MD leaf nodes 1352 and 1356 both indirectly reference the same data block 1362 through the same entry 1357*a* of the VLB 1358. The two MD leaf nodes 1352 and 1356 both referencing the same data block 1362 indirectly through use of the same VLB entry 1357*a* can be a mapping resulting from data deduplication processing. In particular, a first logical address LA1 can have first mapping information which includes a first MD leaf entry of MD leaf 1352 pointing 1372 to the VLB entry 1357*a* indicating that first content of block 1362 is stored at LA1. Additionally, a second logical address LA2 can have second mapping information which includes a second MD leaf entry of MD leaf 1356 pointing 1358*a* to the VLB entry 1357*a* indicating that the first content of block 1362 is also stored at LA2. In the example 1300, MD leaf node 1354 points to the entry 1357*b* of the VLB 1360 whereby the entry 1357*b* of the VLB2 1360 then further references or points to the data block 1364. A third logical address LA3 can have third mapping information which includes a third MD leaf entry of MD leaf 1354 pointing 1360*a* to the VLB entry 1357*b* indicating that content of block 1364 is stored at LA3. The data blocks 1362, 1364 can denote user data blocks as described herein. In at least one embodiment, each MD leaf entry can be associated with a single logical address (e.g., LUN and LBA) which is further mapped to or associated with content stored at the single logical address.

The element 1358*a* denotes a pointer to, or address of, the entry 1357*a* in the VLB 1358 used in connection with obtaining the data block 1362 stored on a particular LUN and LBA of the LUN. The pointer 1358*a* can be used as the virtual or indirect pointer in connection with obtaining the data block 1362. In at least one embodiment, the VLB 1358 can be a VLB page or node as described herein. Thus, in such an embodiment, the virtual or indirect pointer 1358*a* can be a pointer to the entry 1357*a* of the VLB structure 1358, where the entry 1357*a* can further include fields 1301*a* and 1301*b*. The field 1301*b* can be a pointer to, or address of, the user data block 1362. The field 1301*a* can be a reference count or counter indicating the number of instances of, or references to, the particular data block 1362 (e.g., data block pointed to by 1301*b*).

The element 1372 denotes a pointer to, or address of, the entry 1357*a* in the VLB 1358 used in connection with obtaining the data block 1362 stored on a particular LUN and LBA of the LUN. The pointer 1372 can be used as the virtual or indirect pointer in connection with obtaining the data block 1362. In at least one embodiment, the VLB 1358 can be a VLB page or node as described herein. Thus, in such an embodiment, the virtual or indirect pointer 1372 can be a pointer to the entry 1357*a* of the VLB structure 1358, where the entry 1357*a* can further include the fields 1301*a* and 1301*b*. The field 1301*b* can be a pointer to, or address of, the user data block 1362. The field 1301*a* can be a reference count or counter indicating the number of instances of, or references to, the particular data block 1362 (e.g., data block pointed to by 1301*b*).

The element 1360*a* denotes a pointer to, or address of, the entry 1357*b* in the VLB 1360 used in connection with obtaining the data block 1364 stored on a particular LUN and LBA of the LUN. The pointer 1360*a* can be used as the virtual or indirect pointer in connection with obtaining the data block 1364. Thus, in such an embodiment, the virtual or indirect pointer 1360*a* can be a pointer to the entry 1357*b* of the VLB structure 1360, where the entry 1357*b* can further include the fields 1302*a* and 1302*b*. The field 1302*b* can be a pointer to, or address of, the user data block 1364. The field 1302*a* can be a reference count or counter indicating the number of instances of, or references to, the particular data block 1362 (e.g., data block pointed to by 1302*b*).

In at least one embodiment, the reference count 1301*a* can be initialized to 0 and used when the associated data block 1362 becomes a candidate for deduplication. As long as the data storage system includes at least one instance of, and thus at least one reference, to the data block 1362, the reference count 1301*a* will be non-zero. The reference count 1301*a* becomes zero when all instances of, or references to, the data block 1362 are deleted. In this example, the reference 1301*a* is 2 indicating that there are 2 instances of the data block 1362 and thus 2 references to the data block 1362.

In this case, the are 2 instances of the data block 1362 in stored user data. The instances denoted by the reference count 1301*a* include all deduplicated instances corresponding to entries of the MDL leaves 1352, 1356 that respectively point 1372, 1358*a* to the VLB entry 1357*a* associated with the single copy of the data block 1362.

In at least one embodiment, the reference count 1302*a* can be initialized to 0 and used when the associated data block 1364 becomes a candidate for deduplication. As long as the data storage system includes at least one instance of, and thus at least one reference, to the data block 1364, the reference count 1302*a* will be non-zero. The reference count 1302*a* becomes zero when all instances of, or references to, the data block 1364 are deleted. In this example, the reference 1302*a* is 1 indicating that there is 1 instances of the data block 1364 and thus 1 reference to the data block 1364. The instances denoted by the reference count 1302*a* generally include any/all deduplicated instances associated with the single copy of the data block 1364. However, in this example, there is only a single reference to, and single instance of, the data block 1364 in stored user data. Each such reference to a single copy of stored data can be, for example, a logical address such as a LUN and LBA where the referenced data is stored at the logical address.

In at least one embodiment, each VLB can be a VLB page or node as described herein including multiple entries, such as 512 entries, where each such VLB entry can include one or more fields of information such as the address or pointer to one of the data blocks such as 1362 or 1364.

For a read I/O operation received at a node of a dual node system or appliance such as in an active-active configuration, servicing the read operation can include reading one or more data blocks or storage locations as well as reading information from one or more MD pages such as, for example, of the MD or mapping structure as described in connection with FIGS. 6A-D.

For a write I/O operation received at a node of a dual node system or appliance such as in an active-active configuration, servicing the write operation can include reading information from one or more MD pages. Servicing the write operation can include updating one or more data blocks or storage locations as well as updating one or more MD pages such as, for example, of the MD or mapping structure as described in connection with FIGS. 6A-D. In at least one embodiment, the MD or mapping information used in connection with stored user data can be stored on non-volatile storage, such as on the BE PDs of the appliance or data storage system. At least some of the MD or mapping information for all such user data can be stored in a volatile memory cache of each of the nodes of the appliance or system. Depending on the write operation, one or more logical addresses can be updated with new data or content by a write operation. Additionally, one or more MD pages used to map the one or more logical addresses to one or more physical storage locations storing the new data can also be updated, for example, to reference the one or more physical storage location including the new data or content.

With a log-structured system in at least one embodiment, as recorded writes of the log are processed and flushed or destaged to the BE PDs, the content written by the recorded writes of the log can be stored at physical storage locations on the BE PDs. Additionally, the MD or mapping information corresponding to the logged writes being flushed can also be accordingly updated to reference the physical storage locations on the BE PDs containing the content. In a dual node appliance or system with an active-active configuration as described herein, both nodes of the system can concurrently receive and service write I/Os, as well as other received requests and commands using shared resources such as, for example, the MD or mapping structure described in connection with the FIGS. 6A-D.

In at least one embodiment, updates or modifications to the MD pages of the MD or mapping structure described in connection with the FIGS. 6A-D can also similarly be recorded in entries or records of a persistently stored metadata (MD) log and then flushed or destaged from the metadata log to persistent BE storage of the BE PDs. In at least one embodiment, the MD pages of the MD or mapping structure such as described in connection with the FIGS. 6A-D can be persistently stored in a MD page store on the BE PDs of the system. In some contexts herein, the copy of a MD page as stored in the MD page store on the BE PDs can also be referred to herein as the on-disk copy of the MD page.

In some existing implementations, when an update is made to a MD page, the entire resulting MD page with the update applied can be stored in the metadata log file. In such implementations, an excessive amount of storage can used in connection with the metadata log file in that each MD page update can include storing an entire updated MD page in the metadata log file. Additionally, excessive amounts of node-local volatile memory of the nodes can be used in connection with node-local cached copies of portions of the metadata log file.

In at least one implementation, many read and write operations performed with respect to a MD page may only need, respectively, to read or update one field or value of the MD page. For example, a MD update to a MD page can require only updating a relatively small number of bytes, such as 4 bytes or 8 bytes, of a much larger MD page, such as a 4K byte MD page. However, as noted above, existing workflows for some implementations to perform reads and writes to the MD page can include loading the entire MD page into the cache or volatile memory of a node, if the MD page is not already in the cache or volatile memory of the node.

In this manner, existing implementations and workflows such as noted above can consume an excessive of amount of system resources, such as memory and CPU or processor execution time, resulting in performance degradation.

To improve upon the foregoing, a metadata log can be used where updates to MD pages are recorded using only the changes, updates or "deltas" made to the MD pages. For example, many updates to a MD page can be an update or write of a relatively small number of bytes, such as 4 bytes or 8 bytes, of a much larger MD page, such as a 4K byte MD page.

In at least one embodiment in accordance with the techniques of the present disclosure, the metadata updates, changed content, changes or "deltas" made to MD pages (rather than complete updated MD pages) can be recorded in a metadata log (e.g., sometimes denoted as MD log) as stored on a log tier of non-volatile storage or memory. Additionally, in at least one embodiment in accordance with the techniques of the present disclosure, the metadata updates, changes or deltas made to at least some of the MD pages can also be stored in local volatile memories of the nodes of the system. The node local in-memory copy of the metadata changes, updates or deltas made to MD pages as stored on each of the nodes can also sometimes be referred to herein as the in-memory log, in-memory delta log or in-memory metadata log used by each node in connection with performing processing in accordance with the techniques of the present disclosure.

In at least one embodiment, each metadata update, change or delta made to a MD page may be expressed in the form of a tuple represented as (LI, EI, T, V) where:

LI denotes the logical index of the MD page. The LI can be a unique index of the MD page that is updated. The LI can be used to uniquely identify the MD page in the MD or mapping structure such as described elsewhere herein (e.g., FIGS. 6A-D).

EI denotes the entry index denoting a particular entry, offset or location in the MD page denoted by LI.

T denotes the type of metadata update. For example, in at least one embodiment there can be multiple predefined types or allowable values for T. For example, the predefined types or values for T may include one or more of: IDP denoting an update to an address or indirect pointer used to reference a data block (e.g., the indirect pointer may be point to, or be the address of, a VLB entry that further includes an address of, or pointer to, the data block containing user data); INCREF denoting an update to increment by 1 a reference count of a VLB entry associated with a data block containing content that may be stored at one or more logical addresses; DECREF denoting an update to decrement by 1 a reference count of a VLB entry associated with a data block containing content that may be stored at one or more logical addresses. Generally, an embodiment can include any suitable number of predefined types that may vary with the supported metadata updates or changes.

V denotes the updated value to be stored.

It should be noted that the particular value of T denoting a particular type can also denote the size of the data payload V or updated value V of the tuple. For example, a type for T denoting an address can indicate that the size of V is the size or number of bytes or bits of an address or pointer. As another example, a type of T denoting an integer count or counter can indicate that the size of V is the size of an integer, such as 32 bits. In some instances, the value of the type T can imply performing an operation such as increment a counter by 1, or decrement a counter by 1, as noted above. In such cases and in some embodiments, the value for V of the tuple can be implied and omitted when T indicates to perform an increment or decrement operation of a field since such an increase or decrease can be with respect to a current or existing value of the counter.

In at least one embodiment, the metadata changes, updates or deltas made to MD pages as recorded in the in-memory metadata logs of the nodes can be in the form of tuples. In at least one embodiment, the metadata changes, updates or deltas made to MD pages as recorded in the metadata log stored on NVRAM can also be in the form of tuples.

A data storage system can perform different data services such as data deduplication discussed elsewhere herein to remove redundant or duplicate copies of data or content by storing a single copy of the user data and having multiple references or pointers to the same stored single copy. For example, the content or user data can be stored in a single data block that can be referenced by multiple logical addresses where the content of the data block is stored at all the multiple logical addresses.

In connection with data deduplication, the data block that includes the user data or content can be associated with a MD page, where the MD page can include a reference count denoting the number of references to the data block. For example reference is made back to FIG. 6D and discussion above regarding FIG. 6D. In at least one embodiment using the MD structures as described, for example, in connection with FIGS. 6A-D, the reference count associated with a data block can be included in an entry of a VLB page associated with the data block. For example with reference to FIG. 6D, the VLB entry 1357$a$ includes a field 1301$a$ with the reference count=2 for the associated data block 1362; and the VLB entry 1357$b$ includes a field 1301$a$ with the reference count=1 for the associated data block 1364.

The reference count such as of the VLB entries 1357$a$, 1357$b$, can be updated in connection with deduplication processing. For example, deduplication processing can be performed on new data written to a target logical address by a write I/O operation. Deduplication processing can determine that the new data is a duplicate of existing data stored in a data block. Rather than store another copy of the same data in another data block, deduplication processing can include alternatively having the target logical address reference the single existing copy of the data as stored in the data block. As part of deduplication processing, the reference count associated with the single existing copy of the data block can be incremented as each additional reference to the same data block is made. In a similar manner, the reference count can be decremented as content of a particular logical address is modified (e.g., such as by overwriting the same logical address multiple times with different write data) or deleted to no longer be considered a duplicate of the single existing copy.

In at least one system, updates to the MD page can be stored in the metadata log, where the logged MD update is persistently stored in the non-volatile memory metadata log (stored in non-volatile storage which can be NVMRAM) and where the logged MD update is also stored in an in-memory log structure in each node's local volatile memory. In the in-memory log structure in at least one embodiment, each individual update to a particular MD page can be recorded as a separate entry in a bucket of updates associated with the particular MD page. Subsequently, the updates to the MD page as recorded in the in-memory metadata log can be destaged and applied to a persistently stored copy of the MD page. Logging the MD updates such as to the reference count of the MD page can result in improved performance.

In at least one embodiment, the log of user data updates can be flushed where such flushing can include aggregating multiple recorded writes associated with the same MD leaf where the content of the multiple writes associated with the same MD leaf can be stored in the same PLB of BE non-volatile storage.

In at least one embodiment, user data or content located at logical addresses can be stored on multiple storage tiers in a data storage system. A multi-tiered system can include multiple tiers of storage devices. Each tier can include non-volatile storage devices of one particular performance classification such that the tiers can be ranked in terms of relative performance. For example, in at least one system, the tiers can include a first tier 1 of non-volatile SSDs, such as a tier of flash-based drives, and a second tier 2 of HDDs (hard disk drives) or rotating disk drives, where tier 1 is a higher performance tier than tier2. Put another way and more generally, drives of tier 2 can be characterized as a relatively slower performance media than drives of tier1.

In some multi-tiered systems as noted above, the amount of SSD capacity of the higher performance tier for storing user data can be generally much smaller than the HDD capacity of the lower performance tier for storing user data. In at least one system, the SSDs can also effectively act like a write through cache. Since the amount of SSD capacity (e.g., capacity of the higher performance tier) can generally be much less than the HDD capacity (e.g., capacity of the lower performance tier), not all user data can be stored in the SSD tier. As a result, one or more criteria can be specified and used to decide what particular portions of user data or content are stored in each of the SSD tier and the HDD tier.

Described in the following paragraphs are techniques that can be used to track and update one or more metrics of different stored content or data portions, where the metrics characterize the temperature of the corresponding content or data portions. In at least one embodiment, the tracked metrics can be used to further determine a temperature classification, categorization or rating of the corresponding stored content. The temperature classification, categorization or rating can be further used to determine movement of data within the same tier as well as across or among different storage tiers having different relative corresponding performance classifications.

In at least one embodiment, the temperature classification, categorization or rating of stored content can be used to determine what content or data portions from the HDD tier to promote to the SSD tier.

In at least one embodiment, the temperature classification, categorization or rating of stored content can be used to determine what content or data portions from the SSD tier to demote to the HDD tier.

In at least one embodiment, content or data portions stored in the data storage system can be categorized as having a temperature which is one of multiple defined temperature ratings, classifications or categories. In at least one embodiment, content such as associated with a virtual layer block or VLB or a physical block or PLB can be assigned one of the following 3 temperature classifications: hot, warm, and cold. Hot can denotes the highest relative temperature or activity level. Warm can denote the second highest or middle level of relative activity level. Cold can denote the lowest relative temperature or activity level.

In at least one embodiment, newly written content can be initially assigned a temperature classification of hot denoting a high activity level, and the newly written content can be stored in the SSD tier. In such an embodiment, existing content currently stored in the SSD tier having an associated temperature classification or categorization of cold can be demoted to the HDD tier to create free available capacity for use in storing the newly written content as well as other content classified as hot.

In at least one embodiment, the temperature of stored content can be used in connection with performing garbage collection (GC) within each tier such as within the HDD tier and within the SSD tier. In at least one embodiment, processing can identify multiple data portions stored on multiple physical blocks with the same or similar temperature/temperature classification so that such multiple data portions can be aggregated or combined and stored in a single physical block. In this manner, multiple source blocks of the same tier, where such multiple source blocks are only partially filled with valid content having the same or similar temperature or the same temperature classification, can be combined and stored in a single target block thereby freeing or making available the multiple source blocks. Additionally, the resulting single target block of content having the same or similar temperature or same temperature classification can then be moved between tiers as appropriate. For example, if the single block includes cold data and the block is in the SSD tier, the cold data can be demoted to the HDD tier. As another example, if the single block includes hot data and the block is included in the HDD tier, hot data can be promoted to the SSD tier.

In at least one embodiment, the one or more metrics can generally be used to determine a temperature of stored content or an associated data portion and can be used in any suitable application. In such an embodiment, the temperatures of stored content or data portions can be mapped to corresponding temperature classifications used to determine the movement of such content or data portions within and also across storage tiers.

In at least one embodiment, one or more metrics can be mapped or scaled to a corresponding temperature classifications, such as one of hot, warm or cold. In such an embodiment, the boundaries between the different temperature classifications can be dynamically adjusted, such as increased or decreased, based on feedback. In at least one embodiment, a separate read temperature scaling can be applied and used in connection with one or more read metrics, and a separate write temperature scaling can be applied and used in connection with one or more write metrics. The read temperature scaling can map a read metric or temperature to a corresponding read temperature classification that is one of hot, warm or cold (also sometimes referred to respectively as read hot, read warm or read cold). The write temperature scaling can map a write metric to a corresponding write temperature classification that is one of hot, warm or cold (also sometimes referred to respectively as write hot, write warm or write cold). The boundaries between the different temperature classifications can be adjusted, for example, based on desired processing rates. For example, the system can be in a down-tiering or demotion mode where data stored on the SSD tier can be demoted to the HDD tier. The down-tiering mode can be triggered, for example, responsive to determining that the current utilization of the SSD tier is above a specified maximum threshold. In this case, processing can be performed to generate free blocks of the SSD tier in order to store newly received written content in the SSD tier. A down-tiering rate can be determined indicating a rate at which free blocks in the SSD tier are generated while in the down-tiering mode and performing processing to generate free blocks of the SSD tier. If the measured down-tiering rate is insufficient to satisfy a corresponding demand for free SSD tier blocks, the boundary between the cold and warm temperature classification (Bcw) can be increased such that the range of metric values falling into the cold temperature classification increases to thereby expectedly increase the number and rate at which SSD tier blocks are classified as cold. In such an embodiment, cold content stored on a first block of the SSD tier can be demoted to the HDD tier thereby freeing the first block of the SSD tier. In at least one embodiment, the down-tiering rate can be compared to an allocation rate or consumption demand rate at which free blocks of the SSD tier are used to store newly written content. The down-tiering rate can be deemed insufficient if the allocation rate is equal to or greater than the down-tiering rate. In at least one embodiment in a log-based system where write I/O operations are recorded in a log, the allocation rate or demand rate can correspond to a flush rate at which recorded write I/Os are flushed from the log to the SSD tier. In at least one embodiment, free blocks in a tier such as the SSD tier can be generated by demoting cold content of a single SSD tier PLB to the HDD tier. Free blocks in a tier such as the SSD tier can be generating by compaction or combining and moving content of multiple partially filled source PLBs of the SSD tier into a single target PLB of the SSD tier. In at least one embodiment, the content copied from the partially filled source PLBs can all have the same or similar temperature or associated temperature rating or classification.

The foregoing and other aspects of the techniques of the present disclosure are described in more detail in the following paragraphs.

Figure 7A:
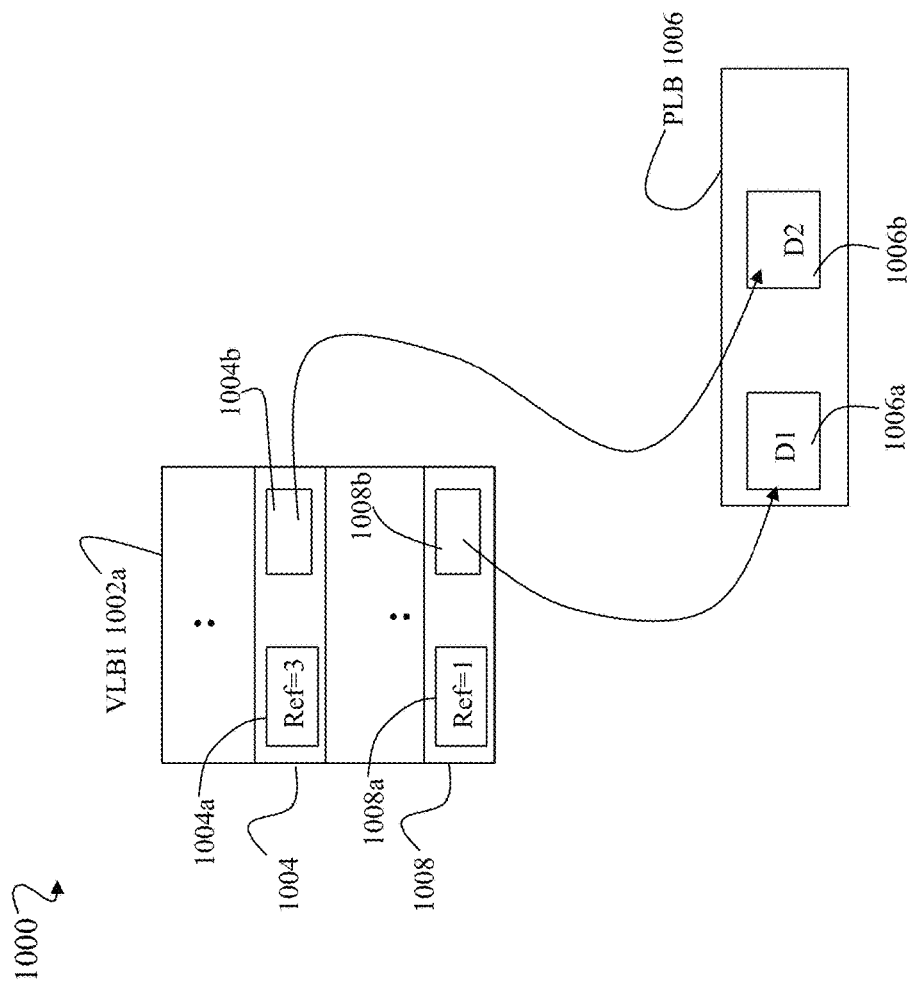
FIGS. 7A and 7B are examples illustrating structures that can be used in at least one embodiment in accordance with the techniques of the present disclosure.

Referring to FIG. 7A, shown is an example 1000 providing further detail regarding entries of a VLB and corresponding referenced content or user data stored on BE PDs in at least one embodiment in accordance with the techniques of the present disclosure.

In at least one embodiment, the mapping information of MD structures, which map a logical address to content or user data stored at the logical address, can be established or updated as a result flushing or destaging an entry of the log (e.g. UD log), where the entry denotes a write operation writing content or data to the logical address.

The example 1000 includes VLB 1002a which is similar to other VLBs described above, for example in connection with FIG. 6D. The physical block or PLB 1006 can correspond to a data block such as, for example, one of the data blocks 1362, 1364 of FIG. 6D. In at least one embodiment, each PLB 1006 can be further partitioned into smaller units of storage such as multiple data pages. For example in at least one embodiment, each PLB can be 2 MB in size where the PLB can be further partitioned into 4K byte pages. The elements 1006a-b can denote 2 such smaller units of storage, such as 4K byte pages, each storing user data or content referenced by a VLB entry. In the example 1000, the VLB entry 1004 includes a reference count 1004a=3 and an associated pointer 1004b to the stored content "D2" in the 4K page 1006b. In the example 1000, the VLB entry 1008 includes a reference count 1008a=1 and an associated pointer 1008b to the stored content "D1" in the 4K page 1006a.

In at least one embodiment, content or data associated with a single VLB can be stored in the same single PLB. However, not all entries of the VLB may be utilized. For example, the VLB may be sparsely populated, or more generally, less than all entries of a single VLB 1002a can be mapped to 4K data portions in the single PLB 1006. As a result, multiple VLBs can have their associated content stored in the single PLB. More generally, one or more VLBs can mapped to the same single PLB.

Figure 7B:
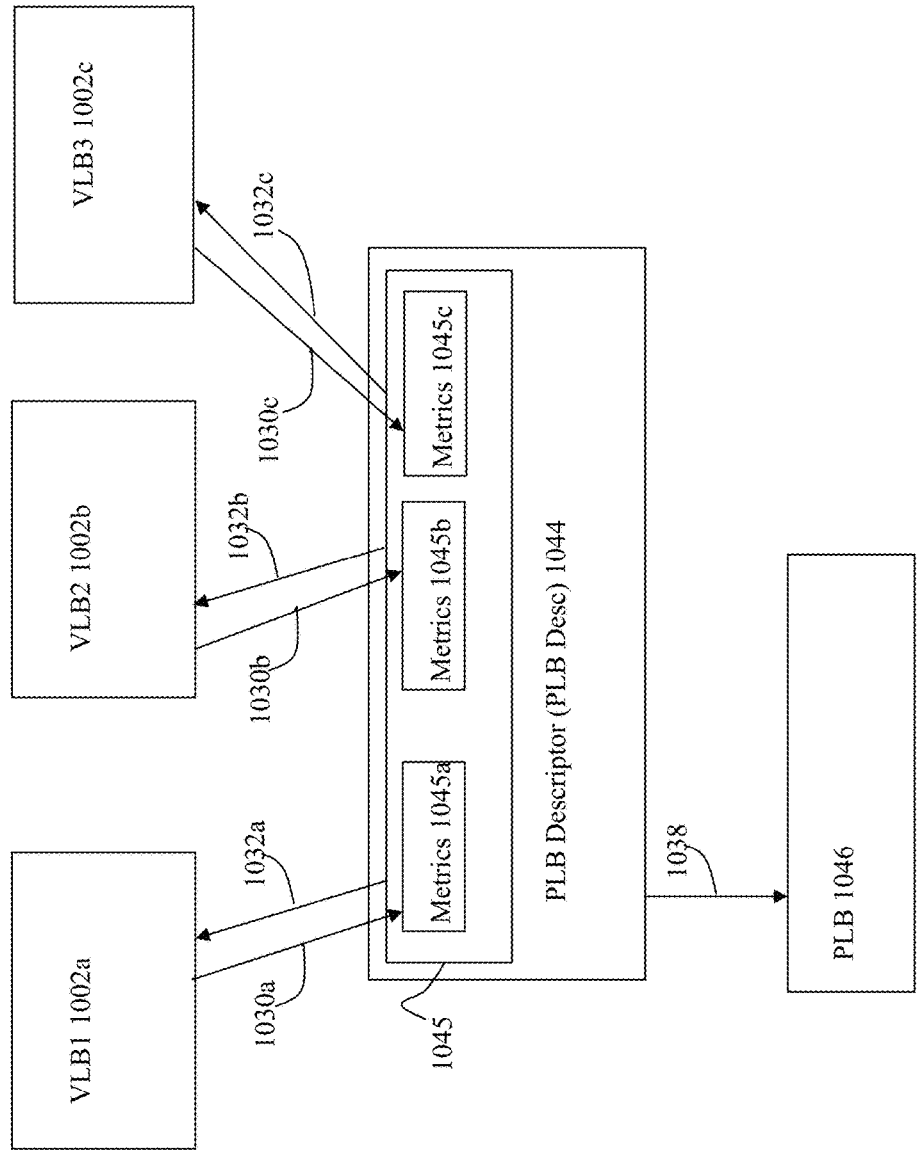

Referring to FIG. 7B, shown is an example 1001 illustrating various pointers and associated between structures which can be used in connection with the techniques of the present disclosure in at least one embodiment.

As noted above, generally one or more VLBs can have their referenced or associated content stored in a single PLB. The example 1001 illustrates 3 VLBs 1002a-c which can have their associated content stored in the single PLB 1046 in a manner as described in more detail above. The PLB descriptor (PLB desc) 1044 can generally be a structure that describes the PLB 1046. For example, the PLB desc 1044 can include a pointer 1038 to the PLB 1046 identifying the address or location of the PLB 1046 on the BE PDs. The PLB desc 1044 can also include other information such as the metrics or statistics 1045 characterizing the activity level of the VLBs 1002a-c. Examples of the metrics or statistics 1045 which can be tracked and maintained for VLBs are discussed in more detail below.

Each of the VLBs 1002a-c can respectively point to (1030a-c) the PLB desc 1044 associated with the PLB 1046 containing content referenced by the VLBs 1002a-c. In a similar manner, the PLB desc 1044 can include pointers 1032a-c respectively to the VLBs 1002a-c which also reference or point to the PLB desc 1044. In particular in at least one embodiment, the pointer 1030a can reference the address of the particular set of metrics 1045a tracked for the VLB 1002a; the pointer 1030b can reference the address of the particular set of metrics 1045b tracked for the VLB 1002b; and the pointer 1030c can reference the address of the particular set of metrics 1045c tracked for the VLB 1002c.

Thus, as illustrated in the example 1001, each VLB points to its associated set of metrics in a PLB descriptor associated with a PLB, where the PLB contains content mapped to a VLB entry of the VLB. Put another way, the VLB points to its associated set of metrics in a PLB descriptor of a PLB which stores content for a logical address mapped to a VLB entry of the VLB.

In at least one embodiment, content or data associated with a single VLB can be stored in the same single PLB. However, not all entries of the VLB may be utilized. For example, the VLB may be sparsely populated, or more generally, less than all entries of a single VLB can be mapped to 4K data portions in the single PLB. As a result, multiple VLBs can have their associated content stored in the single PLB. More generally, one or more VLBs can mapped to the same single PLB and its associated PLB descriptor, where the one or more VLBs reference content stored in the single PLB.

In at least one embodiment, the metrics or statistics tracked for each VLB can include a read temperature (denoting read activity) and a write temperature (denote write activity) with respect to data or content referenced by the VLB. In at least one embodiment, the read temperature of a VLB describes the read activity or read score of the VLB relative to the recency and frequency of read misses or read cache misses for content or data referenced by the VLB. In at least one embodiment, the write temperature of a VLB describes the write activity or write score of the VLB relative to the recency and frequency of overwrites with respect to content or data referenced by the VLB (e.g., where the content or data referenced by the VLB denotes the current content stored at a logical address where the logical address is overwritten with new content or data).

In at least one embodiment, each of the sets or metrics 1045a-c for a corresponding one of the VLBs 1002a-c can include the following information: the last or most recent read temperature for the VLB, the last or more recent write temperature for the VLB, a read timestamp denoting the time of the last or most recent read temperature, and a write timestamp denoting the time of the last or most recent write temperature.

Figure 8:
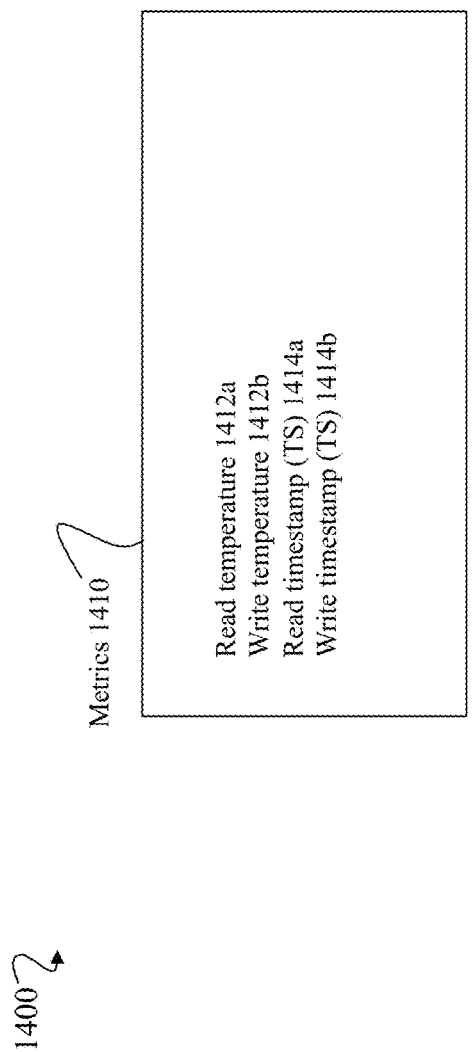
FIG. 8 is an example illustrating information that can be recorded for each virtual layer block or VLB in at least one embodiment in accordance with the techniques of the present disclosure.

With reference to FIG. 8, shown is an example 1400 illustrating the foregoing information that can be included each of the sets or metrics 1045a-c for a corresponding one of the VLBs 1002a-c. Each set of metrics 1410 for a single corresponding VLB can include: 1412a the last or most recent read temperature for the VLB, 1412b the last or more recent write temperature for the VLB, 1414a a read timestamp (TS) denoting the time of the last or most recent read temperature (1412a), and 1414b a write timestamp (TS) denoting the time of the last or most recent write temperature (1412b).

In at least one embodiment, the read temperature of a VLB with respect to stored content of the VLB can be expressed in terms of read misses. In at least one embodiment, the number of read misses for the VLB can be the number of read misses experienced for each VLB entry reference to content stored in the PLB. With reference back to FIG. 6D, each VLB entry such as 1357a can include a pointer field 1301b with points to or references (1359a) a 4K page address in the data block 1362. Thus, the field 1301b can include the address A1 of the 4K page of content stored at a logical address LAx. When performing a read for the logical address LAx which has an associated MD leaf entry mapped to the VLB entry 1358, a read cache miss can occur if the content stored at the address A1 is not already stored in the volatile memory cache.

In at least one embodiment, the write temperature of a VLB with respect to stored content of the VLB can be expressed in terms of overwrites with respect to logical addresses mapped to entries of the VLB (e.g., where content associated with the VLB/entries of the VLB is stored at the logical addresses). Consistent with other discussion herein, for example, such as with respect to FIG. 5B, first data D1 can be stored at a logical address LA1. Subsequently, LA1 can be overwritten with a write I/O that writes new data N1 to LA1 such that N1 overwrites D1 with respect to LA1. However, in a log structured system as described herein in at least one embodiment, D1 can be persisted at a first physical storage location P1 and the new data N1 does not overwrite P1 but rather N1 is persisted to a second different physical storage location P2. Such an overwrite in at least one embodiment results in decrementing the reference count (ref count or counter) associated with the content D1 which is mapped to a VLB entry. In such an embodiment, the overwrite can be determined, detected and counted as an occurrence of a decrement reference counter or DECREF operation with respect to the reference count of the VLB entry associated with the content D1. For example with reference back to FIG. 6D, a DECREF MD update operation with respect to the reference count 1301*a* of the entry 1357*a* of the VLB 1358 can denote an overwrite of a logical address which is mapped to the entry 1357*a*. In at least one embodiment, overwrites can generally include write operations or other operations which result in storing new data to a logical address. In at least one embodiment, overwrites can also include operations which result in deleting a LUN or other storage entity so that the logical addresses of the LUN or storage entity are removed thereby reducing references to the content stored at such logical addresses. In at least one embodiment, overwrites used to determine the write temperature can denote any operation which results in a DECREF operation performed with respect to a reference count of stored content associated with a VLB entry.

The read temperature (RT) of a VLB, for a current time RTnew with an associated timestamp RTSnew, can be represented as RTnew. RTold for a VLB can denote the prior RTnew determined at a prior time Told having an associated timestamp RTSold. RTraw for a VLB can denote a raw read temperature or score regarding the number of cache misses associated with the VLB between the times RTSnew and RTSold. RTraw can denote the number of read cache misses experienced collectively for each VLB entry of the VLB where the VLB entry references content stored in the PLB, and the referenced content is not stored in cache (e.g., such that the referenced content or data needs to be read from the PLB of the BE PD and loaded into the cache for use in servicing the read request causing the read cache miss).

In at least one embodiment, RTnew for a VLB can generally be determined in accordance with RTraw, RTold, RTSnew and RTSold for the VLB. In at least one embodiment:

$$\text{RTnew} = (\text{RTraw} * W1) + (\text{RTold} * W2) \qquad \text{EQUATION 1A}$$

where W1 and W2 are weights. W2 can generally vary in accordance with the age of RTold such as based on the difference between RTSnew and RTSold. In at least one embodiment, the greater the difference and thus the older RTSold, the lower W2. In at least one embodiment, W1=1−W2, where W2 can be based on an exponential decay rate. In at least one embodiment, W2 can be expressed as:

$$W2 = e^{Q1} \qquad \text{EQUATION 2A}$$

where the exponent Q1 can be expressed as:

$$Q1 = -\text{Alpha} * \text{delta}T \qquad \text{EQUATION 3A}$$

where

Alpha is the decay rate and deltaT is the time difference between RTSnew and RTSold, RTSnew-RTSold.

More generally, RTnew can be expressed more generally as a function of RTraw, RTold, RTSnew and RTSold, and can be more formally represented as:

$$\text{RTnew} = F(\text{RTraw}, \text{RTold}, \text{RTSnew}, \text{RTSold}) \qquad \text{EQUATION 4A}$$

where "F" denotes a mathematical function indicating that RTnew is a function of RTraw, RTold, RTSnew, RTSold.

In at least one embodiment the write temperature (WT) of a VLB, for a current time Tnew with an associated timestamp WTSnew, can be represented as WTnew. WTold for a VLB can denote the prior WTnew determined at a prior time Told having an associated timestamp WTSold. WTraw for a VLB can denote a raw write temperature or score regarding the number of overwrites associated with the VLB between WTSnew and WTSold. In at least one embodiment, WTraw can be determined by counting the number of DECREF operations associated with the VLB between the time WTSold and WTSnew. WTraw can denote the number of DECREF operations experienced collectively for each VLB entry of the VLB where the VLB entry references content stored in the PLB, and the reference count of the entry associated with the content is decremented by 1.

$$\text{WTnew} = (\text{WTraw} * W1) + (\text{WTold} * W2) \qquad \text{EQUATION 1B}$$

where W1 and W2 are weights. W2 can generally vary in accordance with the age of WTold such as based on the difference between WTSnew and WTSold. In at least one embodiment, the greater the difference and thus the older TSold, the lower W2. In at least one embodiment, W1=1−W2, where W2 can be based on an exponential decay rate. In at least one embodiment, W2 as used with EQUATION 1B can be as expressed above in connection with EQUATIONs 2A and 3A with the differences that: Alpha of EQUATION 3A denotes the decay rate for write temperature (which can be different than a selected decay rate for read temperature); and deltaT of EQUATION 3A denotes the time different between WTSnew and WTSold.

More generally, WTnew can be expressed more generally as a function of WTraw, WTold, WTSnew and WTSold, and can be more formally represented as:

$$\text{WTnew} = F(\text{WTraw}, \text{WTold}, \text{WTSnew}, \text{WTSold}) \qquad \text{EQUATION 4B}$$

In at least one embodiment, each newly determined read temperature RTnew and write temperature WTnew can be scaled or mapped to an associated scaled relative temperature rating. In at least one embodiment, numerical boundaries or thresholds can be defined which map RTnew to one of multiple temperature ratings such as read hot, read warm and read cold. In at least one embodiment, numerical boundaries or thresholds can be defined which map WTnew to one of multiple temperature ratings such as write hot, write warm and write cold. To further illustrate, for RTnew, LB1 and LB2 can be defined within the range of possible values of RTnew where LB1<LB2, and where if RTnew<LB1, then RTnew is read cold;
if LB1<RTnew≤LB2, then RTnew is read warm; and
if RTnew>LB2, then RTnew is read hot.

To further illustrate, for WTnew, LB3 and LB4 can be defined within the range of possible values of WTnew where LB3<LB4, and where if WTnew<LB3, then WTnew is write cold;
if LB3≤WTnew≤LB4, then WTnew is write warm; and
if WTnew>LB4, then WTnew is write hot.

Generally, LB1, LB2, LB3 and LB4 can be any suitable values. Also an embodiment can generally define any two or more temperature ratings or classifications with associated thresholds or boundaries rather than 3 classification for each of the RTnew and WTnew as illustrated above.

Generally, LB1 can also be referred to as a Bcw for read temperature denoting the boundary between read cold and read warm; and LB2 can also be referred to as a Bwh for read temperature denoting the boundary between read warm and read hot.

Generally, LB3 can also be referred to as a Bcw for write temperature denoting the boundary between write cold and write warm; and LB4 can also be referred to as a Bwh for write temperature denoting the boundary between write warm and write hot.

Figure 9:
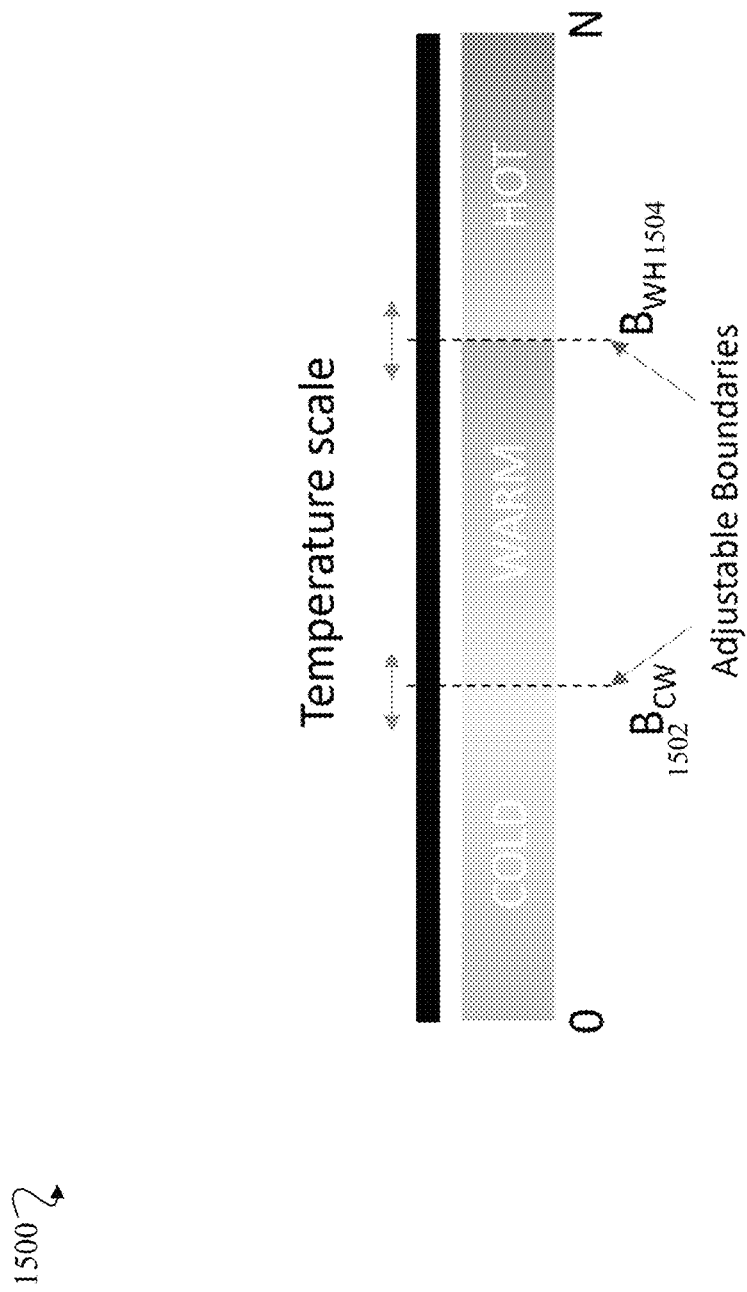
FIG. 9 is an example of a temperature scale that can be used in at least one embodiment in accordance with the techniques of the present disclosure.

Referring to FIG. 9, shown is an example 1500 illustrating the temperature scale and associated mapping of a temperature to a corresponding temperature category or classification in at least one embodiment in accordance with techniques of the present disclosure.

The example 1500 illustrates that the temperature can be a score or metric falling in a range of [0,N] where the closer a VLB's temperature is to 0, the colder the temperature of the content pointed to or referenced by the VLB, and where the closer the VLB's temperature is to N, the warmer or hotter the temperature of the content pointed to or referenced by the VLB.

Consistent with discussion elsewhere herein, the temperature of a VLB (and thus the temperature of the content stored in a PLB where the content is associated with or pointed to by the VLB) can be mapped to one of 3 categories or classifications: hot, warm and cold. The example 1500 generally represents the mapping of a temperature, such as a read temperature or a write temperature, to a corresponding category or classification of hot warm or cold. For a read temperature of a VLB, the categories or classifications can be further refined and referred to sometimes as read hot, read warm and read cold. For a write temperature of a VLB, the categories or classifications can be further refined and referred to sometimes as write hot, write warm and write cold.

Generally as illustrated by the example 1500, a temperature for a metric or score between 0 and Bcw 1502 can be categorized as cold, a temperature between Bcw and Bwh can be categorized as warm, and a temperature between Bwh and N can be categorized as hot. Thus, a pair PR1 of boundaries Bcw 1502 and Bwh 1504 can specified and used with mapping read temperatures of VLBs, and another pair PR2 of boundaries Bcw 1502 and Bwh 1504 can specified and used with mapping write temperatures of VLBs. In at least one embodiment as discussed in more detail below, the pairs of boundaries Bwh and Bcw for classifying read temperature and write temperature can be adjustable and dynamic. In at least one embodiment one or more boundaries of the pairs of boundaries PR1 and PR2 can be dynamically adjusted at various points in time to modify the associated temperature ranges mapped to the different temperature classification or categories in efforts to adjust the number of VLBs with temperatures mapped to the various temperature classifications. For example, Bcw 1502 can be increased to enlarge the range of temperatures between 0 and Bcw 1502 to thereby expectedly increase the number of VLB temperatures classified as cold. Such an adjustment can be made in cases where it is desirable to increase the number of cold VLBs.

Generally, the hotness or coldness of VLBs, and thus content or data referenced by such VLBs and stored on PLBs, is dynamic and relative to the point in time and the need. In at least one embodiment, hotness and coldness of the data, such as with respect to read temperature and/or write temperature, can be adjusted by dynamically adjusting the boundaries between cold-warm and warm-hot on the temperature scale. For example, moving the Cold-Warm boundary Bcw 1502 towards the right to increase Bcw is expected to result in more VLB temperatures classified as cold and thus increase the amount of cold stored content or data of PLBs. For example, moving the Warm-Hot boundary Bwh 1504 towards the left to decrease Bwh is expected to result in more VLB temperatures classified as hot and thus increase the amount of hot stored content or data of PLBs.

In at least one embodiment, the temperature classification with respect to read temperature and/or write temperature of VLBs can be determined when the PLBs are scanned. The PLBs can be scanned in connection with performing any desired operation, application or use of the techniques of the present disclosure. For example, the PLBs of the SSD tier can be scanned to locate cold VLBs referencing cold content (e.g., read cold and/or write cold) where such cold content can be demoted from PLBs of the SSD tier to other PLBs of the HDD tier. As another example, the PLBs can be scanned in connection with processing performed for garbage collection of the SSD tier and/or HDD tier to generate free PLBs. Consistent with discussion herein, garbage collection within a tier can include processing performed where the content of multiple PLBs can be aggregated and copied to a single target PLB such that the net result generates one or more free PLBs in the tier. As another example, the PLBs of the SSD tier can be scanned in connection with performing compacting and appending (also sometimes referred to as a compaction and appending mode, or C and A mode) such as described elsewhere herein in connection with FIG. 12.

When a PLB is examined as part of the process of scanning PLBs, revised read and write temperatures of the VLBs referenced by (e.g., pointed to or associated with) the PLB are calculated relative to the current time during the scan and also based on the sets of metrics last saved or updated for the VLBs. Such VLBs associated with the PLB reference or point to content stored in the PLB. The revised read and write temperatures of the VLBs determined for the scan time can be mapped to corresponding categories or classifications (e.g., such as using the temperature scale as described in connection with FIG. 9).

In at least one embodiment, a new set of activity information can be collected each collection cycle or period. At the end of each collection cycle, the set of activity information can be processed to determine revised sets of metrics for the VLBs, and to persistently store the revised sets of VLB metrics in corresponding PLB descriptors. The revised sets of metrics can be determined as discussed elsewhere using the equations described herein (e.g., EQUATIONS 1A, 2A, 3A and 4A for determining VLB read temperature; EQUATIONS 1B, 2A, 3A and 4B for determining VLB write temperature). The new set of activity information can include any observed or recorded read and/or write activity as related to the metrics of read temperature and write temperature of the VLBs. During the collection cycle in at least one embodiment, the activity information can be recorded in in-memory tablets across multiple cores of the system (e.g., one tablet per core). Each core can record activity information regarding the read activity and write activity performed by the core in the core's corresponding tablet. For example, each core can record activity regarding: the read temperature metric such as number of read misses or read cache misses for content or data referenced by each VLB during the collection cycle; and regarding the write temperature metric such as the number of overwrites (e.g., DECREF operations) for content or data referenced by each VLB during the collection cycle.

A current collection cycle can end responsive to an occurrence of a defined trigger condition. In at least one embodiment, multiple trigger conditions can be defined so that the current collection cycle can end responsive to the occurrence of any one of the multiple trigger conditions. For example, in at least one embodiment, the trigger conditions can include ending the current collection cycle responsive to a specified amount of time elapsing. The specified amount of time can denote a maximum amount of time allowed to elapse before aggregating the new set of activity information of the tablets, determining new sets of updated metrics for the VLBs based on the new set of activity information, and persistently storing the updated sets of metrics for the VLBs in corresponding PLB descriptors. The trigger conditions can include ending the current collection cycle responsive to any one of the multiple tablets reaching a specified level of fullness whereby information of all currently active tablets can be aggregated and included in the new set of activity information.

In at least one embodiment, RTraw for a VLB can denote the raw read temperature for the VLB determined from a set of tablets across multiple cores for a collection cycle or period; RTold for the VLB can be the read temperature as recorded in one of the sets of metrics 1045 associated with the VLB; RTSold (as used when calculating RTnew based on RTraw and RTold) can denote the recorded timestamp of RTold; WTraw for a VLB can denote the raw write temperature for the VLB determined from a set of tablets across multiple cores for a collection cycle or period; WTold for the VLB can be the write temperature as recorded in one of the sets of metrics 1045 associated with the VLB; WTSold (as used when calculating WTnew based on WTraw and WTold) can denote the recorded timestamp of WTold. In at least one embodiment, a set of metrics 1045 as recorded for a VLB can include the last or most recently stored read and write temperature information including RTold, RTSold, WTold, and WTSold, where such information can be used in calculating a next new value for WTnew and RTnew.

In at least one embodiment, RTraw of a VLB for a single collection period can denote a count of read misses associated with entries of the VLB, and WTraw of a VLB for a single collection period can denote a count of decrement reference counter operations (i.e., DECREF operations) associated with reference counters of entries of the VLB.

In at least one embodiment for the activity information collected for each single collection period, processing can be performed to calculate new revised read and write temperatures. For example consistent with other discussion herein regarding EQUATIONS 1A, 2A, 3A and 4A, processing can be performed for activity information collected for a single collection period where such processing can calculate the new or revised read temperature for each VLB where, in such equations, the revised read temperature can be denoted as RTnew, the timestamp (e.g., current time) associated with RTnew can be RTSnew, the current persisted read temperature for the VLB can be RTold, and the current persisted timestamp corresponding to RTold can be RTSold. Additionally, processing can update the persistently stored read temperature and associated timestamp, respectively, to be the revised read temperature (RTnew) just calculated for the VLB and its associated timestamp (RTSnew). Consistent with other discussion herein, processing can persistently store the updated read temperature and associated timestamp in the set of metrics for the VLB, where the set of metrics can be included in the PLB descriptor of the PLB including content referenced by entries of the VLB.

Consistent with other discussion herein regarding EQUATIONS 1B, 2A, 3A and 4B, processing can be performed for activity information collected for a single collection period where such processing can calculate the new or revised write temperature for each VLB where, in such equations, the revised write temperature can be denoted as WTnew, the timestamp (e.g., current time) associated with WTnew can be WTSnew, the current persisted write temperature for the VLB can be WTold, and the current persisted timestamp corresponding to WTold can be WTSold. Additionally, processing can update the persistently stored write temperature and associated timestamp, respectively, to be the revised write temperature (WTnew) just calculated for the VLB and its associated timestamp (WTSnew). Consistent with other discussion herein, processing can persistently store the updated write temperature and associated timestamp in the set of metrics for the VLB, where the set of metrics can be included in the PLB descriptor of the PLB including content referenced by entries of the VLB.

In at least one embodiment, various applications can utilize the last set of persistently stored sets of metrics 1045 for VLBs. Various examples of applications or uses of the persistently stored set of metrics are described elsewhere herein. For example, the PLBs can be scanned in a scan cycle or operation in connection with processing performed for one or more applications or uses of the techniques of the present disclosure. Examples of such applications and uses are described elsewhere herein In some scenarios and embodiments, some time may have elapsed since the last or most recent set of read and/or write temperature information was recorded in a set of VLB metrics 1045. For example, the persisted metrics for a VLB=VLBy may include a read temperature RT1 with an associated timestamp RTS1=12 pm (noon) on Sep. 9, 2022 and a write temperature WT1 with an associated timestamp WTS1=12 pm (noon) on Sep. 9, 2022. However, an application or use of the persistent metrics for the VLBy can be performed at 10 pm on Sep. 9, 2022 and no new revised sets of metrics may have been recorded for VLBy since 12 pm on Sep. 9, 2022. For example, the persisted set of metrics for VLBy can be used in connection with scanning the PLBs to determine content of particular PLBs which can be moved or migrated such as in connection with, for example, demoting content from the SSD tier to the HDD tier, promoting content from the HDD tier to the SSD tier, generating free PLBs in the SSD tier and/or HDD tier by performing garbage collection within the tier, performing compaction and appending of flushed content, and the like. In at least one embodiment, the persisted metrics for the VLBy can be further adjusted based on the current time of use, Tcurr (e.g., 10 pm on Sep. 9, 2022), where there is no read or write activity since the times RTS1 and WTS1. Thus, a revised RTnew can be determined at time Tcurr based on the above-noted EQUATIONS 1A, 2A, 3A and 4A where RTraw=0 (denoting no read activity) so that RTnew (EQUATION 1A) reduces to (RTold*W2), where RTold is the last or most recently persisted read temperature RT1, and W2 (as determined in accordance with EQUATIONS 2A, and 3A) uses deltaT as a difference between RTS1 (which is RTSold) and the current time Tcurr (i.e., where Tcurr denotes the time of use and RTS1=RTSold denotes the last time the read temperature of the VLB metric set for VLBy was updated). In particular with the read temperature calculations noted, deltaT=Tcurr−RTS1. In a similar manner, a revised WTnew can be determined at time Tcurr based on the above-noted EQUATIONS 1B, 2A, 3A and 4B (with differences noted above) where WTraw=0 (denoting no write activity) so that WTnew (EQUATION 1B) reduces to (WTold*W2), where WTold is the last or most recently persisted read temperature WT1, and W2 is determined using a deltaT as a difference between WTS1 (which is WTSold) and the current time Tcurr (i.e., where Tcurr denotes the time of use and WTS1=WTSold denotes the last time the write temperature of the VLB metric set for VLBy was updated). In particular with the write temperature calculations noted, deltaT=Tcurr−WTS1.

Figure 10:
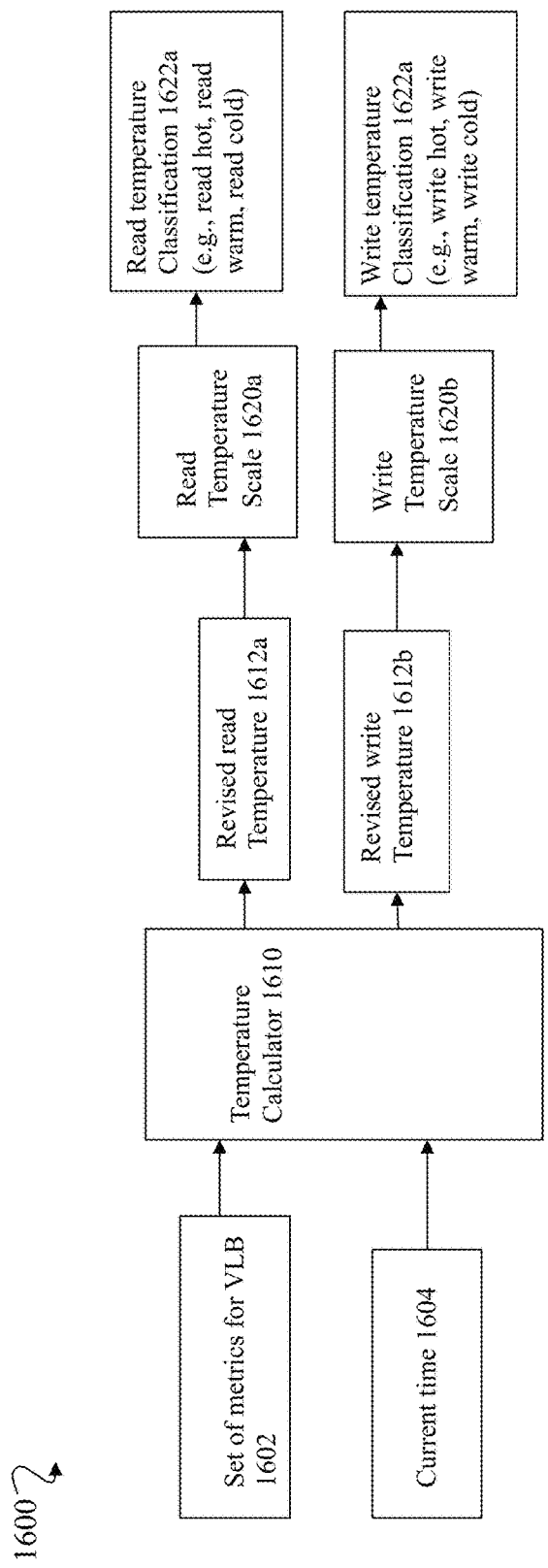
FIGS. 10 and 11 illustrate processing flow that can be performed in at least one embodiment in accordance with the techniques of the present disclosure.

Referring to FIG. 10, shown is an example 1600 illustrating the processing flow which can be performed in at least one embodiment in accordance with the techniques of the present disclosure. The example 1600 illustrates processing that can be performed with respect to components used to determine temperature classifications for a single VLB. The processing of the example 1600 can be performed, for example, when scanning PLBs where VLBs reference content stored in a particular scanned PLB. For each such VLB, the processing as described in the example 1600 can be performed. The processing described in the example 1600 generally summarizes processing described above.

To determine the temperature classification of a VLB at a current time, such as part of processing when scanning PLBs, a set of metrics 1602 for the VLB and the current time 1604 can be provided as inputs to a temperature calculator 1610. The set of metrics 1602 can be the last or most recent persisted set of metrics stored for the VLB. The set of metrics 1602 can be as described, for example, in connection with FIGS. 7B and 8. The temperature calculator 1610 can be a process, module, program, routine or other executable code entity which performs processing to calculate revised temperatures 1612a-b for the VLB. The calculator 1610 can perform processing as described herein using EQUATIONS 1A, 2A, 3A, 4A, 1B and 4B to determine the revised read temperature 1612a and the revised write temperature 1612b for the VLB for the current time. As discussed above, the temperature calculator 1610 can further age the persistently recorded read and write temperatures of 1602 based on the amount of time elapsed between the current time and the time when the temperatures of 1602 were recorded. For the elapsed time, the equations can be utilized where the read activity, RTraw=0 during the elapsed time, and where the write activity, WTraw=0 during the elapsed time.

The revised read temperature 1612a can be provided as an input to the read temperature scale 1620a which generates a read temperature classification 1622a. The revised read temperature 1612a is mapped by the read temperature scale 1620a to a corresponding one of the read temperature categories or classifications. For example, in at least one embodiment described herein such as in connection with FIG. 9, the read temperature 1612a can be mapped to a corresponding read temperature which is one of read hot, read warm or read cold.

The revised write temperature 1612b can be provided as an input to the write temperature scale 1620b which generates a write temperature classification 1622b. The revised write temperature 1612b is mapped by the write temperature scale 1620b to a corresponding one of the read temperature categories or classifications. For example, in at least one embodiment described herein such as in connection with FIG. 9, the write temperature 1612b can be mapped to a corresponding write temperature which is one of write hot, write warm or write cold.

Figure 11:
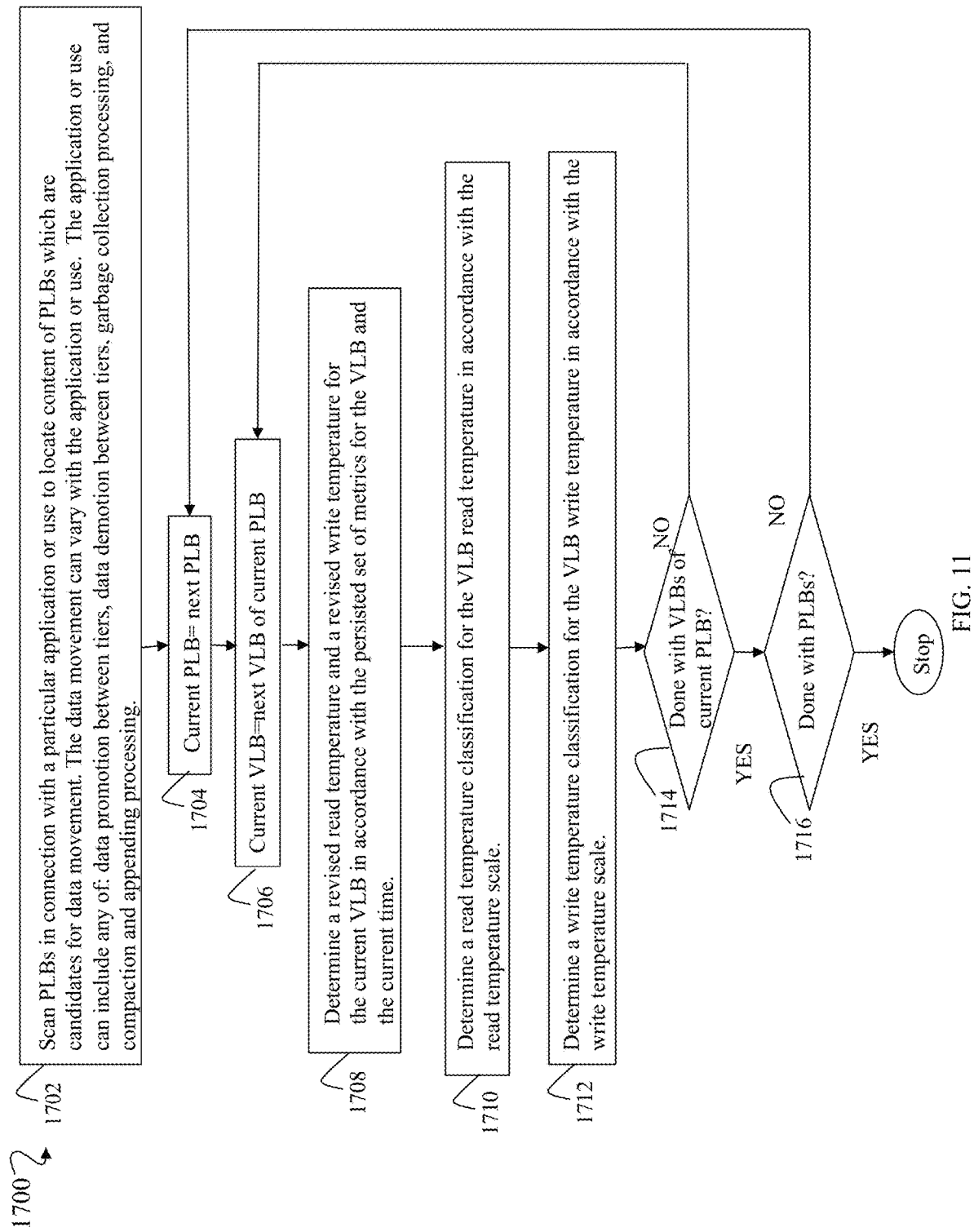

Referring to FIG. 11, shown is a flowchart 1700 of processing steps that can be performed in at least one embodiment in accordance with the techniques of the present disclosure. The flowchart 1700 summarizes processing described above.

At the step 1702, processing can be performed to scan PLBs in connection with a particular application or use to locate content of PLBs which are candidates for data movement. The data movement can vary with the application or use. The application or use can include any of: data promotion between tiers, data demotion between tiers, garbage collection processing, and compaction and appending processing. Generally, not all PLBs of the system are scanned but rather a sufficient number for the particular application or use. From the step 1702, control proceeds to the step 1704.

At the step 1704, the current PLB is assigned the next PLB to be processed. For the current PLB, subsequent steps determine temperatures and associated classifications for VLBs referencing content stored in the current PLB. From the step 1704, control proceeds to the step 1706 where current VLB is assigned the next VLB of the current PLB. From the step 1706, control proceeds to the step 1708.

At the step 1708, processing can be performed to determine a revised read temperature and a revised write temperature for the current VLB in accordance with the persisted set of metrics for the VLB and the current time. Generally, the steps 1706 and 1708 can use the equations described herein and in connection with FIG. 10. From the step 1708, control proceeds to the step 1710.

At the step 1710, processing can be performed to determine a read temperature classification for the VLB read temperature in accordance with the read temperature scale. From the step 1710, control proceeds to the step 1712 where processing can be performed to determine a write temperature classification for the VLB write temperature in accordance with the write temperature scale.

From the step 1712, control proceeds to the step 1714 where a determination is made as to whether processing is done for all VLBs of the current PLB. If the step 1714 evaluates to no, control proceeds to the step 1706 to process the next VLB of the current PLB. If the step 1714 evaluates to yes, control proceeds to the step 1716 where a determination is made as to whether all desired PLBs are processed. If the step 1716 evaluates to yes, processing stops. Otherwise if the step 1716 evaluates to no, control proceeds to the step 1704 to perform processing for the next PLB.

In at least one embodiment, a PLB can be characterized as storing content of one or more read temperature classifications and/or one or more write temperature classifications based on the particular read and write temperature classifications of the VLBs referencing content stored on the PLB. For example, consider an application or use case where cold content of SSD tier PLBs can be demoted to the HDD tier such as to increase the amount of free PLBs in the SSD tier. Processing of FIG. 11 can be performed to locate VLBs characterized as cold, such as read cold, where content referenced by the cold VLBs is stored on PLBs of the SSD tier and where such content is demoted from PLBs of the SSD tier to the HDD tier. In at least one embodiment, the SSD tier PLBs associated with only cold VLBs, such as only read cold VLBs, can be candidates for demoting content stored thereon to the HDD tier. For an SSD tier PLB storing only cold content, once the cold content of the PLB of the SSD tier is moved to the HDD tier, the PLB of the SSD tier is free and available for use. The free SSD tier PLB can be used, for example, to store incoming data such as flushed from the log.

Generally, the sets of metrics including read and write temperatures and associated timestamps for VLBs can be utilized in any suitable application involving data movement within or between tiers. For example, the sets of metrics for VLBs having content stored in one or more PLBs can be used to determine where to locate or store such content in a multi tiered system. To further illustrate, reference is made back to FIG. 7B for the PLB 1046 where 3 VLBs 1002*a-c* have content stored in the PLB 1046. Assume the data storage system includes BE PDs including a first tier 1 of non-volatile SSDs and a second tier 2 of HDDs or rotating disk drives where tier 1 is a higher performance tier relative to tier 2. At a current time M1 the PLB 1046 can denote non-volatile storage of an SSD included in the tier1. Processing can be performed at the time M1 to determine what content or data of PLB, if any, can be demoted from tier1 to another PLB in tier2. In at least one embodiment as discussed elsewhere herein, assume that a read temperature of a VLB can be mapped to or classified as one of the following 3 classifications: read hot, read warm, or read cold; also assume that a write temperature of a VLB can be mapped to or classified as one of the following 3 classifications: write hot, write warm, or write cold. In at least one embodiment, a policy can be in effect or active which includes the following rules regarding data placement generally (e.g., data movement, promotion and demotion):

rule 1: read cold or write cold data which is stored in the SSD tier 1 is demoted from the SSD tier 1 to the HDD tier 2.

rule 2: read cold or write cold data which is stored in the HDD tier2 remains in the HDD tier 2.

rule 3: read hot or write hot data which is stored in the HDD tier 2 is promoted from the HDD tier 2 to the SSD tier 1.

rule 4: read hot or write hot data which is stored in the SSD tier 1 remains in the SSD tier 1.

rule 5: read warm or write warm data which is stored in the SSD tier 1 can remain in the SSD tier 1.

At the time current time M1, processing can be performed to determine a current read temperature RTnew and a current write temperature WTnew for the VLB 1002*a* using the last updated persistently stored set of metrics 1045*a*. The metrics 1045*a* can include a read temperature used as RTold, a timestamp RTSold of the persisted last updated read temperature RTold, a write temperature used as WTold, and a timestamp WT old of the persisted last updated write temperature WT old. Generally, RTnew and WTnew can be calculated consistent with other discussion and equations herein. For example, RTnew can be calculated consistent with discussion herein using EQUATIONS 1A, 2A, and 3A; and WTnew can be calculated consistent with discussion herein using EQUATIONS 1B, 2A and 3A. When calculating RTnew, the deltaT of EQUATION 3A is the time difference between M1 and RTSold, and RTraw of EQUATION 1A can be zero. When calculating WTnew, the deltaT of EQUATION 3A is the time difference between M1 and WTSold, and WTraw of EQUATION 1B can be zero. Once the current read temperature RTnew and current write temperature WTnew are calculated using the last updated metrics 1045*a* for the VLB 1002*a*, RTnew can be further mapped to one of the three read temperature classifications of read hot, read warm or read hold, and WTnew can be further mapped to one of the three write temperature classification of write hot, write warm or write cold. Based on the read temperature classification and the write temperature classification determined for the VLB 1002*a*, relevant rules of the above-noted policy can be applied to determine whether the content referenced by entries of VLB 1002*a* remains in the SSD tier 1, or is otherwise demoted to the HDD tier 2. Since in this example the PLB 1046 is storage of the SSD tier1, the rules 1, 4 and 5 are relevant and can be applied based on the read temperature classification and the write temperature classification of VLB 1002*a*. For example based on the rules 1, 4 and 5, if the read temperature classification of the VLB 1002*a* is read hot or read warm, content referenced by entries of VLB 1002*a*, where such content is stored in PLB 1046 can remain in PLB 1046 of the SSD tier 1. Similarly if the write temperature classification of the VLB 1002*a* is write hot or write warm, content referenced by entries of VLB 1002*a*, where such content is stored in PLB 1046 can remain in PLB 1046 of the SSD tier 1. If the read temperature classification of the VLB 1002*a* is read cold, content referenced by entries of VLB 1002*a*, where such content is stored in PLB 1046 can be demoted from the SSD tier 1 to the HDD tier 2. In this case, the content referenced by entries of VLB 1002*a* can be moved or migrated from the PLB 1046 of SSD tier 1 to another PLB of the HDD tier2. If the write temperature classification of the VLB 1002*a* is write cold, content referenced by entries of VLB 1002*a*, where such content is stored in PLB 1046 can be demoted from the SSD tier 1 to the HDD tier 2. In this case, the content referenced by entries of VLB 1002*a* can be moved or migrated from the PLB 1046 of SSD tier 1 to another PLB of the HDD tier2.

As another example, consider the case where the PLB 1046 is storage of the HDD tier 1 where, the rules 2 and 3 are relevant and can be applied based on the read temperature classification and the write temperature classification of VLB 1002*a*. For example based on the rules 2 and 3, if the read temperature classification of the VLB 1002*a* is read hot or read warm, content referenced by entries of VLB 1002*a*, where such content is stored in PLB 1046 can be promoted from the PLB 1046 of HDD tier 2 to another PLB of the SSD tier 1. In this case, the content referenced by entries of VLB 1002*a* can be moved or migrated from the PLB 1046 of HDD tier 2 to another PLB of the SSD tier1. If the read temperature classification of the VLB 1002*a* is read cold, content referenced by entries of VLB 1002*a*, where such content is stored in PLB 1046, can remain in the PLB 1046 of the HDD tier 2.

It should be noted that a conflict can occur in connection with application of the above policy rules, for example, where the VLB 1002*a* has one associated temperature classification that is hot and another associated temperature classification that is cold. For example consider the case where the PLB 1046 is in the SSD tier 1 and where the VLB 1002*a* is read hot and write cold. Application of rules 1, 4 and 5 can lead to a conflict in that rule 1 indicates that the content referenced by entries of VLB 1002*a* should be demoted from the SSD tier1 to the HDD tier 2 because of the write cold classification. In contrast, application of rule 4 indicates that the content referenced by entries of VLB 1002*a* can remain in the PLB 1046 in the SSD1 tier due to the read hot classification. In such a case, the foregoing conflict can be resolved in favor of placement of the data or content on the highest performance tier indicated by any of the rules so that content remains in the SSD tier1 because the VLB has at least one associated temperature classification of "hot" (e.g., either read hot or write hot). Generally, an embodiment can resolve any such conflicts in any suitable manner where such resolution can be specified by yet another rule of the policy.

As described above in connection with the VLB 1002*a*, similar processing can be performed in connection with each of the remaining VLBs 1002*b-c* to determine a corresponding read temperature classification and a corresponding write temperature classification for each of the VLBs 1002*b-c*, and then subsequently apply the policy rules to determine placement of the content referenced by each of the VLBs 1002*b-c*, where such referenced content is currently stored on the PLB 1046.

What will now be described are further examples of use cases of the techniques of the present disclosure. Such use cases describe scenarios where the temperature classifications of content referenced by VLBs and stored on PLBs can used in connection with performing data movements within a single storage tier and between storage tiers.

What will now be described is an "SSD hot" use case scenario in connection with hot content stored in the SSD tier. For the SSD hot scenario in at least one embodiment, newly written content or data can be written to the SSD tier since the newly written content or data can be assigned an initial temperature classification of read hot and write hot. There may be an insufficient number of free PLBs in the SSD tier so that there is no free PLB in the SSD tier to store the new content. In this case, processing can identify a partially filled PLB of the SSD tier where the partially filled PLB includes only hot data, or more generally, includes valid content or data where at least a threshold amount or percentage of the valid content or data is classified as read hot and/or write hot.

In at least one embodiment, the partially filled SSD tier PLB identified can have at least a threshold amount or percentage of free storage. For example, the partially filled PLB can have an associated utilization denoted as a percentage. Utilization, such as of a single PLB, can be expressed as a percentage or ratio of allocated consumed storage that contains valid data with respect to the total storage capacity of the PLB. For example, if 25% of the PLB is allocated and includes valid data and the remaining 75% of the PLB is unused and free (e.g., contains invalid data or holes of unused storage), the utilization for the single PLB is 25%. In at least one embodiment, the partially filled PLB used to store newly written content or data can have a utilization that is not more than a maximum utilization such as not more than 50% utilized, where the existing content of the partially filled PLB is classified as read hot and/or write hot, or more generally, where at least a specified percentage or amount of the valid data stored in the PLB is classified as read hot and/or write hot.

Within the single partially filled PLB, the valid data and the holes (e.g., containing invalid data or designated as an unused portion) can be interspersed since, for example, write granularity size units can be 4K chunks or blocks. With reference to the example 1450 of FIG. 12, the element 1452 can denote a single PLB which is partially filled with valid content C1, C2 and C3. As can be seen in 1452, C1, C2 and C3 are not stored contiguously in the PLB 1450 can have holes or invalid data or unused storage areas denoted as U1-U4. Thus, element 1452 can denote the state of the PLB at a first point in time. Subsequent to the first point in time, a compaction operation can be performed with respect to the partially filled PLB 1452 to store the content of the partially filled PLB in a contiguous region at one end of the PLB to eliminate interspersed holes of invalid content or unused storage. The element 1454 illustrates the partially filled PLB after compaction where the existing content C1, C2 and C3 of the PLB can be located in one contiguous region 1462 with the remaining free storage region included in another contiguous region 1464. After compaction of the PLB as illustrated in 1454, the newly written content flushed from the log can be stored in the free region 1464 of the partially filled PLB 1454.

The newly written content or data can be stored on the partially filled PLB along with the compacted existing content (1462) of the partially filed PLB. Thus, the partially filled PLB can be associated with VLBs each having a corresponding hot temperature classification. In at least one embodiment, the partially filled PLB can be associated with VLBs which are hot, such as write hot and/or read hot. In at least one embodiment, all VLBs associated with the partially filled PLB used as a target for storing the new content can be hot, such as where each VLB is write hot and/or read hot. As a variation in at least one embodiment, at least a specified amount of the existing content of the partially filled PLB can be hot and/or warm in order to be considered a candidate for compaction and then storing newly written content thereon such as illustrated in FIG. 12.

Figure 12:
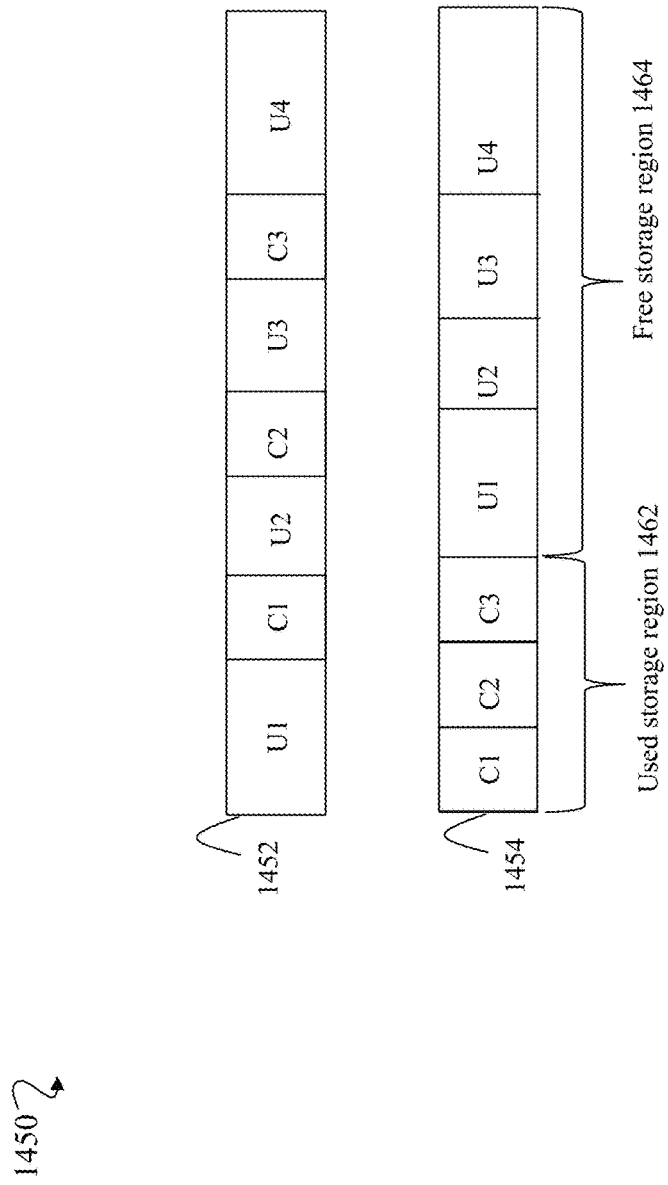
FIG. 12 is an example illustrating compaction and appending in at least one embodiment in accordance with techniques of the present disclosure.

The processing performed in connection with FIG. 12 can also be referred to herein as compact and append or compaction and appending (e.g., C and A) mode or processing. In at least one embodiment, the PLB 1452 and the PLB 1454 can be 2 different PLBs where the PLB 1452 denotes a source PLB and the PLB 1454 denotes a target PLB. In this case, the compaction operation aggregates the hot content C1-C3 of the source PLB 1452 and stores the aggregated content C1-C3 as a compacted single contiguous data portion (1462) on the target PLB 1454 at one end of the PLB 1454. Subsequently additional content can be appended to the existing content of used storage region 1462, where the additional content can be stored in the free storage region 1464.

What will now be described is an "SSD warm" use case scenario in connection with warm content stored in the SSD tier. For the SSD warm scenario in at least one embodiment, garbage collection can be performed to consolidate the valid data in the 2 partially filled source PLBs into a single target PLB by copying the valid data from the 2 source PLBs to the target PLB. Assume the 2 source PLBs and the target PLB are in the SSD tier, the 2 source PLBs include only warm content, and the target PLB can be free or partially filled such as with only warm content. In this case, the foregoing consolidation results in a net gain of 1 free PLB by freeing the 2 source PLBs, and consuming or using the single target PLB that contains the consolidated valid data from the 2 original source PLBs. As another example, consider 4 source PLBs each with only warm content and having a 25% utilization (e.g., each PLB contains 25% valid data with the remaining 75% of the PLB containing invalid or free holes of storage). In this case, garbage collection can be performed to consolidate the valid warm data of the 4 source PLBs into a single target PLB by copying the valid warm data from the 4 source PLBs to the target PLB. The foregoing consolidation results in a net gain of 3 free PLBs by freeing the 4 source PLBs, and consuming or using the single target PLB that contains the consolidated valid data from the 4 original source PLBs. In at least one embodiment, the source and target PLBs of the SSD tier can be selected for garbage collection to generate at least one net free PLB. It should be noted that garbage collection can more generally be performed within any single tier for content with any temperature classification to generate net free PLBs in the tier by combining content of partially filled source PLBs and storing the aggregated content in a single target PLB.

What will now be described is an "SSD cold" use case scenario in connection with cold content stored in the SSD tier in at least one embodiment. For cold content of a PLB in the SSD tier (where the content is associated with, or pointed to, by a VLB categorized as cold such as read cold and/or write cold), the cold content of the SSD tier PLB can be demoted where the cold content is copied from the source SSD tier PLB to a target PLB in the HDD tier. In this manner where the source SSD tier PLB includes only cold data, the source SSD tier PLB can be freed and made available for storing other content.

In another application or use, cold content stored on multiple source PLBs of the SSD tier can be garbage collected where the valid cold content is aggregated and copied from the multiple source PLBs of the SSD tier to a target PLB. The target PLB can be in the SSD tier or the HDD tier. The target PLB can be a free PLB or a partially filled PLB. In at least one embodiment, the target PLB can include cold content. If the source PLBs of the SSD tier are partially filled and include only cold content which is copied to the target PLB, the source PLBs can be freed or available for use since all valid content of the source PLBs has been consolidated and stored on the target PLB. In at least one embodiment, the source and target PLBs can be selected to generate at least one net free PLB. If the source PLBs include other valid content which is not cold and not copied to the target PLB, the source PLBs are not freed. However, the resulting target PLB includes only cold content where if the target PLB is in the SSD tier, the cold content of the target PLB in the SSD tier can then subsequently be demoted to the HDD tier.

What will now be described is an "HDD hot" use case scenario in connection with hot content stored in the HDD tier. For the HDD hot scenario in at least one embodiment, for hot content of a PLB in the HDD tier (where the content is associated with, or pointed to, by a VLB categorized as hot such as read hot and/or write hot), the hot content of the HDD tier PLB can be promoted where the hot content is copied from the source HDD tier PLB to a target PLB in SSD tier. In this manner, the hot content can be promoted to the faster or higher performance SSD tier to improve performance. For example, if the content is read hot, such promotion from the HDD tier PLB to the target PLB in the SSD tier can improve read performance.

In another application or use, hot content stored on multiple source PLBs of the HDD tier can be garbage collected where the valid hot content is aggregated and copied from the multiple source PLBs of the HDD tier to a target PLB. The target PLB can be in the SSD tier or the HDD tier. The target PLB can be a free PLB or a partially filled PLB. In at least one embodiment, the target PLB can include hot content. If the source PLBs of the HDD tier include only hot content which is copied to the target PLB, the source PLBs can be freed or available for use since all valid content of the source PLBs has been consolidated and stored on the target PLB. In at least one embodiment, the source and target PLBs can be selected to generate at least one net free PLB. If the source PLBs include other valid content which is not hot and not copied to the target PLB, the source PLBs are not freed. However, the resulting target PLB includes only hot content where if the target PLB is in the HDD tier, the hot content of the target PLB in the HDD tier can then subsequently be promoted to the SSD tier.

What will now be described is an "HDD warm" use case scenario in connection with warm content stored in the HDD tier. For the HDD warm scenario in at least one embodiment, content classified as warm or hot which resides in a PLB of the SSD tier can remain in the SSD tier and not demoted to the HDD tier. Cold content stored in a PLB of the SSD tier can be demoted to the HDD tier. In at least one embodiment, there may not be any free storage in the SSD tier for storing newly written content flushed from the log. In this case, the newly written content can be stored in a PLB of the HDD tier. The newly written content can be categorized as hot (e.g., read hot and/or write hot) and stored in a free PLB of the HDD tier. Alternatively such as when there is no free PLB in the HDD tier, the newly written content can be stored in a partially filled PLB of the HDD tier. The partially filed PLB of the HDD tier can include existing content that is hot and/or warm which can be compacted into a contiguous used storage region in manner as described, for example, in connection with FIG. 12 to create a contiguous free storage region. Subsequently, the newly written content can be stored in the contiguous free storage of the partially filled PLB (along with the existing content stored in the used storage region).

What will now be described is an "HDD cold" use case scenario in connection with cold content stored in the HDD tier. For the HDD cold scenario in at least one embodiment, garbage collection can be performed to consolidate the valid data in the 2 partially filled source PLBs into a single target PLB by copying the valid data from the 2 source PLBs to the target PLB. Assume the 2 source PLBs and the target PLB are in the HDD tier, the 2 source PLBs include only cold content, and the target PLB can be free or partially filled such as with only cold content. In this case, the foregoing consolidation results in a net gain of 1 free PLB by freeing the 2 source PLBs, and consuming or using the single target PLB that contains the consolidated valid data from the 2 original source PLBs. As another example, consider 4 source PLBs each with only cold content and having a 25% utilization (e.g., each PLB contains 25% valid data with the remaining 75% of the PLB containing invalid or free holes of storage). In this case, garbage collection can be performed to consolidate the valid cold data of the 4 source PLBs into a single target PLB by copying the valid cold data from the 4 source PLBs to the target PLB. The foregoing consolidation results in a net gain of 3 free PLBs by freeing the 4 source PLBs, and consuming or using the single target PLB that contains the consolidated valid data from the 4 original source PLBs. In at least one embodiment, the source and target PLBs of the HDD tier can be selected for garbage collection to generate at least one net free PLB in the HDD tier. The free PLB of the HDD tier can be used, for example, to store demoted data or to store newly flushed written content in instances, for example, where the SSD tier has no available storage capacity for storing newly flushed content.

In at least one embodiment with reference to FIG. 9, the boundaries Bcw and Bwh, respectively, between cold-warm and warm-hot of the read temperature scale and/or write temperature scale can be adjusted based on feedback of various operations In at least one embodiment, such operations providing feedback can include:

1. Down-Tiering or demotion: The system can be in down-tiering or demotion mode if the utilization of the SSD tier is above certain threshold, and the SSD tier needs free PLBs to store incoming data such as content flushed from the log. The utilization of the SSD tier can be a percentage denoting a percentage of the SSD tier storing valid content. In at least one embodiment, down-tiering or demotion processing can provide the following feedback:

a. Down-Tiering or demotion rate: Rate at which the free PLBs are generated in SSD tier by down-tiering or demoting data from the SSD tier to the HDD tier. Additionally provided as related feedback can be the flush rate at which data is flushed from the log. More generally, the flush rate can denote the consumption rate of PLBs of the SSD tier such as to store content or user data of logged writes flushed from the log.
b. Down-Tiering or demotion Efficiency: This describes the amount or rate of data movement from the SSD tier to the HDD tier during a down-tiering or demotion operation. Generally, the higher the rate or amount of data moved, the more efficient the down-tiering or demotion operation.

2. Garbage Collection: The system can perform garbage collection within the SSD tier or the HDD tier if the system is not in down-tiering or demotion mode and the system has idle cycles. The system can perform garbage collection within the HDD tier, for example, if the system is not in down-tiering or demotion mode and the HDD tier needs free PLBs to support future down-tiering operations. Garbage collection in a tier can be performed responsive to the number of free PLBs being below a specified threshold, or responsive to the tier having a utilization above a specified threshold, where utilization denotes a percentage of tier storage storing valid content.

3. Compaction and appending (C and A0 mode: the SSD tier can be in C and A mode if current number of free PLBs in the SSD tier is below a specified threshold level.

Based on the feedback of the above operations between two PLB scan operations, the boundary Bcw between Cold-Warm in the read temperature scale and/or write temperature scale, can be increased and moved to the right if any one or more of the following conditions are true:

If the system is in down tiering mode and if after the current scan, the down-tiering rate is less than the flush rate or PLB consumption rate, thereby indicating that an insufficient number of cold SSD tier PLBs were available to demote or down-tier; or If the down-tiering or demotion efficiency of the down-tiering operation is less than a specified level. In this case, locating candidate PLBs with a higher utilization can improve the efficiency of the down-tiering or demotion operation processing.

Based on the feedback of the above operations between two PLB scan operations, the boundary Bcw between Cold-Warm in the read temperature scale and/or write temperature scale, can be decreased and moved to the left if any one or more of the following conditions are true:

If the system is in down tiering or demotion mode and the down-tiering or demotion rate is greater than the consumption rate of PLBs of the SSD tier by at least a specified amount; or If the system is in down tiering or demotion mode and the number of free PLBs in the SSD tier is sufficient to satisfy the required SSD tier PLB consumption rate. For example, the current number of free PLBs can be sufficient to satisfy the number of free PLBs expected to be consumed in the next one or more PLB scan cycle or operation time. In this case, the existing free PLBs of the SSD tier can be characterized as a reserve or pool of free PLBs which is large enough to satisfy or meet the expected consumption demand for one or more expected subsequent PLB scan cycles; or If down-tiering or demotion is currently disabled.

Based on the feedback of the above operations between two PLB scan operations, the boundary Bwh between Warm and Hot in the read temperature scale and/or write temperature scale, can be decreased and moved to the left if the system is in C and A mode and not enough hot partial PLBs are found in the SSD tier during the current PLB scan to satisfy the flush demand rate or PLB consumption rate. In at least one embodiment, the system can be in C and A mode if the number of free PLBs in the SSD tier falls below a specified threshold. In this case, a partially filled SSD tier PLB with hot content can be aggregated and compacted and stored in a target PLB of the SSD tier, and new content flushed from the log can be appended to the compacted existing content of the target PLB (e.g., as described in connection with FIG. 12 and elsewhere herein).

Based on the feedback of the above operations between two PLB scan operations, the boundary Bwh between Warm and Hot in the read temperature scale and/or write temperature scale, can be increased and moved to the right if the system is not in C and A mode with respect to the SSD tier and the system is also garbage collecting the warm data or content of the SSD tier.

In at least one embodiment, each boundary adjustment can be a relatively small increment to avoid drastic or extreme movements of boundaries. A boundary adjustment can be subject to certain rules or restrictions. For example, a boundary adjustment to a first boundary cannot result in crossing over another boundary. The foregoing can avoid, for example, having Bcw adjusted to be greater than Bwh. Boundaries can be adjusted and maintained such that there is a minimum distance between the boundaries Bcw and Bwh, a minimum distance between Bcw and the lower bound of 0 of the temperature scale, and also a minimum distance between Bwh and the upper bound of N of the temperature scale.

In at least one embodiment, each of the read temperature and write temperature can have its own temperature scale and associated boundaries Bcw and BWh where the boundaries Bcw, Bwh of the read temperature scale can be adjusted independently of the boundaries Bcw, Bwh of the write temperature scale based on feedback of various operations as described herein.

The techniques herein can be performed by any suitable hardware and/or software. For example, techniques herein can be performed by executing code which is stored on any one or more different forms of computer-readable media, where the code can be executed by one or more processors, for example, such as processors of a computer or other system, an ASIC (application specific integrated circuit), and the like. Computer-readable media can include different forms of volatile (e.g., RAM) and non-volatile (e.g., ROM, flash memory, magnetic or optical disks, or tape) storage which can be removable or non-removable.

While the techniques of the present disclosure have been presented in connection with embodiments shown and described in detail herein, their modifications and improvements thereon will become readily apparent to those skilled in the art. Accordingly, the spirit and scope of the techniques of the present disclosure should be limited only by the following claims.

What is claimed is:

1. A computer implemented method comprising:
receiving metric sets for a plurality of virtual blocks, wherein each of the plurality of virtual blocks has associated I/O activity characterized by a corresponding one of the metric sets, wherein each of the plurality of virtual blocks references content stored in one of a plurality of physical blocks, wherein each of the plurality of physical blocks is stored in one of a plurality of storage tiers including a first storage tier and a second storage tier which is a lower performance tier than the first storage tier;

determining a plurality of temperature classifications for the plurality of virtual blocks in accordance with the metric sets, a current point in time, and at least a first temperature scale, wherein the first temperature scale maps a first temperature metric denoting I/O activity to one of a plurality of temperature classifications, wherein the plurality of temperature classifications includes a hot classification and a cold classification, wherein each of the plurality of virtual blocks with the hot classification indicates that said each virtual block has a relatively higher activity level in comparison to every other virtual block of the plurality of virtual blocks having the cold classification;

determining that a current number of free blocks in the first storage tier is below a minimum; and responsive to determining the current number of free blocks in the first storage tier is below the minimum, performing first processing including;

determining a first of the plurality of physical blocks associated with a first set of one or more of the plurality of virtual blocks, wherein each virtual block of the first set references content stored in the first physical block, wherein each virtual block of the first set has the hot classification, wherein the first physical block is included in the first storage tier and is partially filled with first content referenced by the first set of virtual blocks;

copying the first content from the first physical block of the first storage tier to a second physical block of the first storage tier;

flushing a record from a user data log, wherein the record represents a first write I/O operation that writes updated content; and storing the updated content on the second physical block, wherein said storing includes appending the updated content to the first content on the second physical block.

2. The computer-implemented method of claim 1, wherein the first content is stored as a plurality of non-contiguous data portions on the first physical block.

3. The computer-implemented method of claim 2, wherein the first content is stored on the second physical block as a single contiguous data portion.

4. The computer-implemented method of claim 1, wherein the first set of virtual blocks includes a first virtual block, wherein a first of the metric sets characterizes I/O activity of a first data portion of the first content, wherein the first data portion is referenced by the first virtual block, and wherein the method includes:

determining, in accordance with the first metric set and the current point in time, a revised temperature regarding any of read activity and write activity of the first virtual block; and mapping the revised temperature to the hot classification in accordance with the first temperature scale.

5. The computer-implemented method of claim 4, wherein the plurality of temperature classifications includes a warm classification, wherein each of the plurality of virtual blocks with the warm classification indicates that said each virtual block has a relatively higher activity level in comparison to every other virtual block of the plurality of virtual blocks having the cold classification and that said each block has a relatively lower activity level in comparison to every other virtual block of the plurality of virtual blocks having the hot classification.

6. The computer-implemented method of claim 5, wherein the first temperature scale includes a first adjustable boundary, denoting an activity level boundary between the cold classification and the warm classification, and includes a second adjustable boundary, denoting an activity level boundary between the warm classification and the hot classification.

7. The computer-implemented method of claim 6, further comprising:

adjusting at least one of the first adjustable boundary or the second adjustable boundary in accordance with feedback regarding one or more operations performed.

8. The computer-implemented method of claim 7, wherein the first storage tier has a first utilization above a maximum utilization threshold, and wherein the method includes:

setting a system in which said method is performed in a down-tiering or demotion mode responsive to determining the first utilization of the first storage tier is above the maximum threshold, wherein said feedback includes an indication that the system is in said down-tiering or demotion mode; and demoting data portions stored in the first storage to the second storage tier.

9. The computer-implemented method of claim 8, further comprising:

determining that a demand rate, denoting a rate at which free physical blocks of the first storage tier are consumed, is greater than a down-tiering or demotion rate at which free physical blocks are generated in the first storage tier; and responsive to determining that the demand rate is greater than the down-tiering or demotion rate, adjusting the first adjustable boundary between the cold classification and the warm classification, and wherein said feedback includes the demand rate and the down-tiering or demotion rate.

10. The computer-implemented method of claim 9, wherein responsive to determining that the demand rate is greater than the down-tiering or demotion rate, said adjusting the first adjustable boundary increases the first adjustable boundary to increase a portion of a range of temperature values mapped to the cold classification.

11. The computer-implemented method of claim 8, further comprising:

determining that a demand rate, denoting a rate at which free physical blocks of the first storage tier are consumed, is less than a down-tiering or demotion rate by at least a specified amount, wherein the down-tiering or demotion rate denotes a rate at which free physical blocks are generated in the first storage tier; and responsive to determining that the demand rate is less than the down-tiering or demotion rate by at least the specified amount, adjusting the first adjustable boundary between the cold classification and the warm classification, wherein said feedback includes the demand rate and the down-tiering or demotion rate.

12. The computer-implemented method of claim 11, wherein responsive to determining that the demand rate is less than the down-tiering or demotion rate by at least the specified amount, said adjusting the first adjustable boundary decreases the first adjustable boundary to decrease a portion of a range of temperature values mapped to the cold classification.

13. The computer-implemented method of claim 7, wherein a system in which said method is performed is in a compact and append mode and there is an insufficient number of partially filled physical blocks with content having the hot classification in the first storage tier to satisfy a flush rate, wherein the flush rate denotes a rate at which recorded write I/O operations stored in a log are flushed from the log, wherein write data written by the recorded write I/O operations flushed from the log is stored in the first storage tier, and wherein said feedback includes an indication that the system is in the compact and append mode and an indication that there is an insufficient number of partially filled physical blocks with content having the hot classification in the first storage tier to satisfy a flush rate.

14. The computer-implemented method of claim 13, further comprising:
responsive to determining the system is in the compact and append mode and that there is an insufficient number of partially filled physical blocks with content having the hot classification in the first storage tier to satisfy a flush rate, adjusting the second adjustable boundary denoting an activity level boundary between the warm classification and the hot classification.

15. The computer-implemented method of claim 14, wherein said adjusting the second adjustable boundary includes decreasing the second adjustable boundary to thereby expand the portion of a range of temperature values mapped to the hot classification.

16. The computer-implemented method of claim 7, wherein a system in which said method is performed is not in a compact and append mode with respect to the first storage tier and the system is performing garbage collection to collect content which is stored in the first storage tier and which has the warm classification, and wherein said feedback includes an indication that the system is not in the compact and append mode and an indication that the system is performing garbage collection to collect content which is stored in the first storage tier and which has the warm classification.

17. The computer-implemented method of claim 16, further comprising:
responsive to determining that the system is not in the compact and append mode with respect to the first storage tier and that the system is performing garbage collection to collect content which is stored in the first storage tier and which has the warm classification, adjusting the second adjustable boundary.

18. The computer-implemented method of claim 17, wherein said adjusting the second adjustable boundary includes increasing the second adjustable boundary to thereby reduce a portion of a range of temperature values mapped to the hot classification.

19. A system comprising:
one or more processors; and
a memory comprising code stored thereon that, when executed, performs a method comprising:
receiving metric sets for a plurality of virtual blocks, wherein each of the plurality of virtual blocks has associated I/O activity characterized by a corresponding one of the metric sets, wherein each of the plurality of virtual blocks references content stored in one of a plurality of physical blocks, wherein each of the plurality of physical blocks is stored in one of a plurality of storage tiers including a first storage tier and a second storage tier which is a lower performance tier than the first storage tier;
determining a plurality of temperature classifications for the plurality of virtual blocks in accordance with the metric sets, a current point in time, and at least a first temperature scale, wherein the first temperature scale maps a first temperature metric denoting I/O activity to one of a plurality of temperature classifications, wherein the plurality of temperature classifications includes a hot classification and a cold classification, wherein each of the plurality of virtual blocks with the hot classification indicates that said each virtual block has a relatively higher activity level in comparison to every other virtual block of the plurality of virtual blocks having the cold classification;
determining that a current number of free blocks in the first storage tier is below a minimum; and
responsive to determining the current number of free blocks in the first storage tier is below the minimum, performing first processing including:
determining a first of the plurality of physical blocks associated with a first set of one or more of the plurality of virtual blocks, wherein each virtual block of the first set references content stored in the first physical block, wherein each virtual block of the first set has the hot classification, wherein the first physical block is included in the first storage tier and is partially filled with first content referenced by the first set of virtual blocks;
copying the first content from the first physical block of the first storage tier to a second physical block of the first storage tier;
flushing a record from a user data log, wherein the record represents a first write I/O operation that writes updated content; and
storing the updated content on the second physical block, wherein said storing includes appending the updated content to the first content on the second physical block.

20. A non-transitory computer readable medium comprising code stored thereon that, when executed, performs a method comprising:
receiving metric sets for a plurality of virtual blocks, wherein each of the plurality of virtual blocks has associated I/O activity characterized by a corresponding one of the metric sets, wherein each of the plurality of virtual blocks references content stored in one of a plurality of physical blocks, wherein each of the plurality of physical blocks is stored in one of a plurality of storage tiers including a first storage tier and a second storage tier which is a lower performance tier than the first storage tier;
determining a plurality of temperature classifications for the plurality of virtual blocks in accordance with the metric sets, a current point in time, and at least a first temperature scale, wherein the first temperature scale maps a first temperature metric denoting I/O activity to one of a plurality of temperature classifications, wherein the plurality of temperature classifications includes a hot classification and a cold classification, wherein each of the plurality of virtual blocks with the hot classification indicates that said each virtual block has a relatively higher activity level in comparison to every other virtual block of the plurality of virtual blocks having the cold classification;
determining that a current number of free blocks in the first storage tier is below a minimum; and responsive to determining the current number of free blocks in the first storage tier is below the minimum, performing first processing including;
- determining a first of the plurality of physical blocks associated with a first set of one or more of the plurality of virtual blocks, wherein each virtual block of the first set references content stored in the first physical block, wherein each virtual block of the first set has the hot classification, wherein the first physical block is included in the first storage tier and is partially filled with first content referenced by the first set of virtual blocks;
- copying the first content from the first physical block of the first storage tier to a second physical block of the first storage tier;
- flushing a record from a user data log, wherein the record represents a first write I/O operation that writes updated content; and
- storing the updated content on the second physical block, wherein said storing includes appending the updated content to the first content on the second physical block.

* * * * *

UNITED STATES PATENT AND TRADEMARK OFFICE
CERTIFICATE OF CORRECTION

| | |
|---|---|
| PATENT NO. | : 12,050,775 B2 |
| APPLICATION NO. | : 17/971939 |
| DATED | : July 30, 2024 |
| INVENTOR(S) | : Vamsi K. Vankamamidi et al. |

It is certified that error appears in the above-identified patent and that said Letters Patent is hereby corrected as shown below:

In the Claims

Column 51, Line 22:
In Claim 1, the phrase "performing first processing including;" should read -- performing first processing including: --

Signed and Sealed this
Third Day of September, 2024

Katherine Kelly Vidal
*Director of the United States Patent and Trademark Office*